United States Patent
Miess et al.

(10) Patent No.: US 10,738,821 B2
(45) Date of Patent: Aug. 11, 2020

(54) POLYCRYSTALLINE DIAMOND RADIAL BEARING

(71) Applicants: David P. Miess, Spring, TX (US);
Gregory Prevost, Spring, TX (US);
Michael Williams, Houston, TX (US);
Edward C. Spatz, San Marcos, TX (US); Michael R. Reese, Houston, TX (US); William W. King, Houston, TX (US)

(72) Inventors: David P. Miess, Spring, TX (US);
Gregory Prevost, Spring, TX (US);
Michael Williams, Houston, TX (US);
Edward C. Spatz, San Marcos, TX (US); Michael R. Reese, Houston, TX (US); William W. King, Houston, TX (US)

(73) Assignee: XR Downhole, LLC, Houston, TX (US)

( * ) Notice: Subject to any disclaimer, the term of this patent is extended or adjusted under 35 U.S.C. 154(b) by 0 days.

(21) Appl. No.: 16/049,608

(22) Filed: Jul. 30, 2018

(65) Prior Publication Data
US 2020/0032841 A1    Jan. 30, 2020

(51) Int. Cl.
*F16C 17/02*    (2006.01)

(52) U.S. Cl.
CPC .......... *F16C 17/02* (2013.01); *F16C 2206/04* (2013.01); *F16C 2380/26* (2013.01)

(58) Field of Classification Search
CPC ........ F16C 17/02; F16C 17/10; F16C 17/105; F16C 33/043; F16C 2206/04; F16C 2380/26
See application file for complete search history.

(56) References Cited

U.S. PATENT DOCUMENTS

| 1,963,956 A | 6/1934 | James |
| 2,259,023 A | 10/1941 | Clark |
| 2,299,978 A | 10/1942 | Hall |
| 2,567,735 A | 9/1951 | Scott |
| 2,758,181 A | 8/1956 | Crouch |

(Continued)

FOREIGN PATENT DOCUMENTS

| JP | 06174051 A | 6/1994 |
| WO | 2004001238 A2 | 12/2003 |
| WO | 2017105883 A1 | 6/2017 |

OTHER PUBLICATIONS

Element six, The Element Six CVD Diamond Handbook, obtained from Applicant on Nov. 22, 2019.*

(Continued)

*Primary Examiner* — James Pilkington
(74) *Attorney, Agent, or Firm* — Michael S. McCoy; Amatong McCoy LLC

(57) ABSTRACT

A radial bearing assembly is provided. The radial bearing assembly includes polycrystalline diamond elements, each having an engagement surface in sliding engagement with an opposing engagement surface. The opposing engagement surface includes a diamond reactive material. The radial bearing assembly may be deployed in a variety of components and applications, including in rotor and stator assemblies. Also provided are methods of use of the radial bearing assembly, as well as methods of designing the radial bearing assembly.

49 Claims, 13 Drawing Sheets

(56) References Cited

U.S. PATENT DOCUMENTS

| | | | |
|---|---|---|---|
| 2,788,677 A | 4/1957 | Hayek | |
| 2,877,662 A | 3/1959 | Eduard | |
| 2,897,016 A | 7/1959 | Baker | |
| 2,947,609 A * | 8/1960 | Strong | B01J 3/062 423/446 |
| 2,947,610 A | 8/1960 | Hall et al. | |
| 3,559,802 A | 2/1971 | Eidus | |
| 3,650,714 A * | 3/1972 | Farkas | C04B 41/009 51/295 |
| 3,697,141 A | 10/1972 | Garrett | |
| 3,741,252 A | 6/1973 | Williams | |
| 3,745,623 A | 7/1973 | Wentorf et al. | |
| 3,866,987 A | 2/1975 | Garner | |
| 3,869,947 A | 3/1975 | Vandenkieboom | |
| 3,920,290 A | 11/1975 | Evarts | |
| 4,085,634 A | 4/1978 | Sattler | |
| 4,182,537 A | 1/1980 | Oster | |
| 4,225,322 A | 9/1980 | Knemeyer | |
| 4,238,137 A | 12/1980 | Furchak et al. | |
| 4,285,550 A | 8/1981 | Blackburn et al. | |
| 4,398,772 A | 8/1983 | Odell | |
| 4,410,054 A | 10/1983 | Nagel et al. | |
| 4,410,284 A | 10/1983 | Herrick | |
| 4,468,138 A | 8/1984 | Nagel | |
| 4,554,208 A | 11/1985 | MacIver et al. | |
| 4,560,014 A | 12/1985 | Geczy | |
| 4,620,601 A | 11/1986 | Nagel | |
| RE32,380 E | 3/1987 | Wentorf, Jr. et al. | |
| 4,662,348 A | 5/1987 | Hall et al. | |
| 4,679,639 A | 7/1987 | Barr et al. | |
| 4,689,847 A | 9/1987 | Huber | |
| 4,720,199 A | 1/1988 | Geczy et al. | |
| 4,729,440 A | 3/1988 | Hall | |
| 4,732,490 A | 3/1988 | Masciarelli | |
| 4,764,036 A | 8/1988 | McPherson | |
| 4,796,670 A | 1/1989 | Russell et al. | |
| 4,797,011 A | 1/1989 | Saeki et al. | |
| 4,858,688 A | 8/1989 | Edwards et al. | |
| 4,906,528 A * | 3/1990 | Cerceau | B22F 7/06 419/12 |
| 4,958,692 A | 9/1990 | Anderson | |
| 5,011,514 A | 4/1991 | Cho et al. | |
| 5,011,515 A * | 4/1991 | Frushour | B22F 7/06 175/420.2 |
| 5,030,276 A | 7/1991 | Sung et al. | |
| 5,037,212 A | 8/1991 | Justman et al. | |
| 5,066,145 A | 11/1991 | Sibley et al. | |
| 5,067,826 A | 11/1991 | Lemelson | |
| 5,092,687 A | 3/1992 | Hall | |
| 5,112,146 A | 5/1992 | Stangeland | |
| 5,151,107 A | 9/1992 | Cho et al. | |
| 5,205,188 A | 4/1993 | Repenning et al. | |
| 5,253,939 A | 10/1993 | Hall | |
| 5,271,749 A * | 12/1993 | Rai | B24D 3/06 501/87 |
| 5,351,770 A | 10/1994 | Cawthorne et al. | |
| 5,358,041 A | 10/1994 | O'Hair | |
| 5,358,337 A | 10/1994 | Codatto | |
| 5,375,679 A | 12/1994 | Biehl | |
| 5,385,715 A * | 1/1995 | Fish | B01J 3/062 423/446 |
| 5,447,208 A | 9/1995 | Lund et al. | |
| 5,462,362 A | 10/1995 | Yuhta et al. | |
| 5,464,086 A | 11/1995 | Coelln | |
| 5,522,467 A | 6/1996 | Stevens et al. | |
| 5,533,604 A | 7/1996 | Brierton | |
| 5,538,346 A | 7/1996 | Frias et al. | |
| 5,540,314 A | 7/1996 | Coelln | |
| 5,560,716 A | 10/1996 | Tank et al. | |
| 5,653,300 A | 8/1997 | Lund et al. | |
| 5,715,898 A | 2/1998 | Anderson | |
| 5,833,019 A | 11/1998 | Gynz-Rekowski | |
| 5,855,996 A | 1/1999 | Corrigan et al. | |
| 5,948,541 A * | 9/1999 | Inspektor | C23C 28/00 407/119 |
| 6,109,790 A | 8/2000 | Gynz-Rekowski et al. | |
| 6,120,185 A | 9/2000 | Masciarelli, Jr. | |
| 6,129,195 A | 10/2000 | Matheny | |
| 6,152,223 A | 11/2000 | Abdo et al. | |
| 6,164,109 A | 12/2000 | Bartosch | |
| 6,279,716 B1 | 8/2001 | Kayatani et al. | |
| 6,378,633 B1 | 4/2002 | Moore et al. | |
| 6,409,388 B1 | 6/2002 | Lin | |
| 6,457,865 B1 | 10/2002 | Masciarelli, Jr. | |
| 6,488,103 B1 | 12/2002 | Dennis et al. | |
| 6,488,715 B1 | 12/2002 | Pope et al. | |
| 6,516,934 B2 | 2/2003 | Masciarelli, Jr. | |
| 6,652,201 B2 | 11/2003 | Kunimori et al. | |
| 6,655,845 B1 | 12/2003 | Pope et al. | |
| 6,737,377 B1 | 5/2004 | Sumiya et al. | |
| 6,808,019 B1 | 10/2004 | Mabry | |
| 6,814,775 B2 * | 11/2004 | Scurlock | B23B 27/148 419/12 |
| 7,007,787 B2 | 3/2006 | Pallini et al. | |
| 7,198,043 B1 * | 4/2007 | Zhang | B23B 1/00 125/39 |
| 7,475,744 B2 | 1/2009 | Pope | |
| 7,552,782 B1 | 6/2009 | Sexton et al. | |
| 7,703,982 B2 | 4/2010 | Cooley | |
| 7,737,377 B1 * | 6/2010 | Dodal | H01H 23/08 200/339 |
| 7,845,436 B2 | 12/2010 | Cooley et al. | |
| 7,861,805 B2 | 1/2011 | Dick et al. | |
| 8,069,933 B2 | 12/2011 | Sexton et al. | |
| 8,109,247 B2 | 2/2012 | Wakade et al. | |
| 8,277,722 B2 | 10/2012 | DiGiovanni | |
| 8,485,284 B2 * | 7/2013 | Sithebe | B01J 3/065 175/434 |
| 8,613,554 B2 | 12/2013 | Tessier et al. | |
| 8,627,904 B2 * | 1/2014 | Voronin | B22F 7/04 175/420.2 |
| 8,678,657 B1 | 3/2014 | Knuteson et al. | |
| 8,701,797 B2 | 4/2014 | Baudoin | |
| 8,763,727 B2 | 7/2014 | Cooley et al. | |
| 8,764,295 B2 * | 7/2014 | Dadson | E21B 4/003 384/282 |
| 8,881,849 B2 | 11/2014 | Shen et al. | |
| 9,004,198 B2 | 4/2015 | Kulkarni | |
| 9,010,418 B2 | 4/2015 | Pereyra et al. | |
| 9,145,743 B2 | 9/2015 | Shen et al. | |
| 9,404,310 B1 | 8/2016 | Sani et al. | |
| 9,488,221 B2 * | 11/2016 | Gonzalez | F16C 33/043 |
| 9,562,562 B2 * | 2/2017 | Peterson | F16C 17/10 |
| 9,643,293 B1 | 5/2017 | Miess et al. | |
| 9,702,401 B2 | 7/2017 | Gonzalez | |
| 9,790,749 B2 | 10/2017 | Chen | |
| 9,790,818 B2 | 10/2017 | Berruet et al. | |
| 9,803,432 B2 | 10/2017 | Wood et al. | |
| 9,822,523 B1 | 11/2017 | Miess | |
| 9,840,875 B2 | 12/2017 | Harvey et al. | |
| 9,869,135 B1 | 1/2018 | Martin | |
| 10,113,362 B2 | 10/2018 | Ritchie et al. | |
| 10,294,986 B2 | 5/2019 | Gonzalez | |
| 10,307,891 B2 | 6/2019 | Daniels et al. | |
| 2002/0020526 A1 | 2/2002 | Male et al. | |
| 2003/0159834 A1 | 8/2003 | Kirk et al. | |
| 2004/0031625 A1 | 2/2004 | Lin et al. | |
| 2004/0219362 A1 | 11/2004 | Wort et al. | |
| 2007/0046119 A1 | 3/2007 | Cooley | |
| 2008/0217063 A1 | 9/2008 | Moore et al. | |
| 2008/0253706 A1 | 10/2008 | Bischof et al. | |
| 2009/0020046 A1 | 1/2009 | Marcelli | |
| 2010/0037864 A1 | 2/2010 | Dutt et al. | |
| 2011/0203791 A1 | 8/2011 | Jin et al. | |
| 2011/0220415 A1 | 9/2011 | Jin et al. | |
| 2011/0297454 A1 | 12/2011 | Shen et al. | |
| 2013/0000442 A1 | 1/2013 | Wiesner et al. | |
| 2013/0004106 A1 * | 1/2013 | Wenzel | F16C 17/10 384/428 |
| 2013/0146367 A1 | 6/2013 | Zhang et al. | |
| 2014/0254967 A1 | 9/2014 | Gonzalez | |

(56) References Cited

U.S. PATENT DOCUMENTS

| | | | |
|---|---|---|---|
| 2015/0132539 | A1 | 5/2015 | Bailey et al. |
| 2016/0153243 | A1 | 6/2016 | Hinz et al. |
| 2016/0312535 | A1 | 10/2016 | Ritchie et al. |
| 2017/0138224 | A1 | 5/2017 | Henry et al. |
| 2017/0234071 | A1 | 8/2017 | Spatz et al. |
| 2018/0087134 | A1 | 3/2018 | Chang et al. |
| 2018/0209476 | A1 | 7/2018 | Gonzalez |
| 2019/0063495 | A1* | 2/2019 | Peterson ............... F16C 33/043 |

OTHER PUBLICATIONS

Machinery's Handbook, 2016, Industrial Press, INC., 30th edition, pp. 843 and 1055.*
Bovenkerk, Dr. H. P.; Bundy, DR. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.
Chen, Y.; Nguyen, T; Zhang, L.C.; Polishing of polycrystalline diamond by the technique of dynamic friction-Part 5: Quantitative analysis of material removal, International Journal of Machine Tools & Manufacture, 2009, pp. 515-520, vol. 49, Elsevier.
Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.
Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.
Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.
Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.
Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.
Hudson Bearings Air Cargo Ball Transfers brochure, 8 Pages, Columbus, Ohio.
Hudson Bearings Air Cargo Ball Transfers Installation and Maintenance Protocols, pp. 1-5.
Liao, Y.; Marks, L.; In situ single asperity wear at the nanometre scale, International Materials Reviews, 2016, pp. 1-17, Taylor & Francis.
Machinery's Handbook 30th Edition, Copyright Page and Coefficients of Friction Page, 2016, p. 158 (2 Pages total), Industrial Press, Inc., South Norwalk, U.S.A.
McCarthy, J. Michael; Cam and Follower Systems, PowerPoint Presentation, Jul. 25, 2009, pp. 1-14, UCIrvine the Henry Samueli School of Engineering.
McGill Cam Follower Bearings brochure, 2005, p. 1-19, Back Page, Brochure MCCF-05, Form #8991 (20 Pages total).
Motion & Control NSK Cam Followers (Stud Type Track Rollers) Roller Followers (Yoke Type Track Rollers) catalog, 1991, Cover Page, pp. 1-18, Back Page, Cat. No. E1421 2004 C-11, Japan.
Product Catalogue, Asahi Diamond Industrial Australia Pty. Ltd., Cover Page, Blank Page, 2 Notes Pages, Table of contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).
Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
United States Defensive Publication No. T102,901, published Apr. 5, 1983, in U.S. Appl. No. 298,271 [2 Pages].
USSynthetic Bearings and Waukesha Bearings brochure for Diamond Tilting Pad Thrust Bearings, 2015, 2 Pages.
USSynthetic Bearings brochure, 12 Pages, Orem, Utah.
Zhigadlo, N. D., Spontaneous growth of diamond from MnNi solvent-catalyst using opposed anvil-type high-pressure apparatus, pp. 1-12, Laboratory for Solid State Physics, Switzerland.
Zhou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.
Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.
Zeidan, Fouad Y.; Paquette, Donald J., Application of High Speed and High Performance Fluid Film Bearings in Rotating Machinery, 1994, pp. 209-234.
International Search Report and Written Opinion dated Oct. 29, 2019 (issued in PCT Application No. PCT/US2019/043741) [15 pages].
International Search Report and Written Opinion dated Oct. 21, 2019 (issued in PCT Application No. PCT/US2019/043746) [14 pages].
International Search Report and Written Opinion dated Oct. 22, 2019 (issued in PCT Application No. PCT/US2019/043744) [11 pages].
International Search Report and Written Opinion dated Oct. 25, 2019 (issued in PCT Application No. PCT/US2019/044682) [20 pages].
International Search Report and Written Opinion dated Sep. 9, 2019 (issued in PCT Application No. PCT/US2019/043732) [10 pages].

* cited by examiner

POLYCRYSTALLINE DIAMOND RADIAL BEARING

CROSS-REFERENCE TO RELATED APPLICATIONS

The present application is related to U.S. patent application Ser. No. 15/430,254 (pending) entitled Drilling Machine filed Feb. 10, 2017 and assigned to the same assignee as the present application and which is incorporated herein in its entirety as if set out in full. The present application is also related to: the concurrently filed U.S. patent application Ser. No. 16/049,631 (pending) entitled "Roller Ball Assembly with Superhard Elements"; the concurrently filed U.S. patent application Ser. No. 16/049,588 (pending) entitled "Cam Follower with Polycrystalline Diamond Engagement Element"; and the concurrently filed U.S. patent application Ser. No. 16/049,617 (pending) entitled "Polycrystalline Diamond Thrust Bearing and Element Thereof", each of which is assigned to the same assignee as the present application and is incorporated herein by reference in its entirety as if set out in full.

STATEMENT REGARDING FEDERALLY SPONSORED RESEARCH OF DEVELOPMENT

Not applicable.

FIELD

The present disclosure relates to radial bearings, apparatus and systems including the same, and methods of use thereof.

BACKGROUND

Radial bearings are used in tools, machines, and components to bear load. Thermally stable polycrystalline diamond (TSP), either supported or unsupported by tungsten carbide, and polycrystalline diamond compact (PDC or PCD) have been considered as contraindicated for use in the machining of diamond reactive materials, including ferrous metals, and other metals, metal alloys, composites, hard facings, coatings, or platings that contain more than trace amounts of diamond catalyst or solvent elements including cobalt, nickel, ruthenium, rhodium, palladium, chromium, manganese, copper, titanium, or tantalum. Further, this prior contraindication of the use of polycrystalline diamond extends to so called "superalloys", including iron-based, cobalt-based and nickel-based superalloys containing more than trace amounts of diamond catalyst or solvent elements. The surface speeds typically used in machining of such materials typically ranges from about 0.2 m/s to about 5 m/s. Although these surface speeds are not particularly high, the load and attendant temperature generated, such as at a cutting tip, often exceeds the graphitization temperature of diamond (i.e., about 700° C. or 973.15 K), which can, in the presence of diamond catalyst or solvent elements, lead to rapid wear and failure of components. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623, which is incorporated herein by reference in its entirety. The contraindication of polycrystalline diamond for machining diamond catalyst or diamond solvent containing materials has long caused the avoidance of the use of polycrystalline diamond in all contacting applications with such materials.

Polycrystalline diamond radial bearings have been developed that have polycrystalline diamond bearing surfaces that mate with non-ferrous superhard materials or, much more commonly, with tightly-matched complementary polycrystalline diamond surfaces. As used herein, a "superhard material" is a material that is at least as hard as tungsten carbide (e.g., cemented tungsten carbide or tungsten carbide tiles). An exemplary reference concerning polycrystalline diamond radial bearings, either in contact with superhard materials or with matching polycrystalline diamond, is U.S. Pat. No. 4,764,036, to McPherson and assigned to Smith International Inc., the entirety of which is incorporated herein by reference. As would be understood by one skilled in the art, hardness may be determined using the Brinell scale, such as in accordance with ASTM E10-14.

So called high-performance polycrystalline diamond bearings are designed particularly for harsh environments, such as downhole drilling and pumping environments or wind turbine energy units, and utilize sliding, mated, overlapping polycrystalline diamond elements. This requires a large number of polycrystalline diamond elements, each shaped with an exacting outer profile. For example, rotor mounted polycrystalline diamond elements are shaped with a convex outer profile substantially matched to an outer diameter of the rotor. Stator polycrystalline diamond elements are shaped with a concave outer profile substantially matched to an inner diameter of the stator. This shaping of the polycrystalline diamond elements requires exacting precision and is expensive, requiring, for example, cutting with electrical discharge machining (EDM), lasers, or diamond grinding. The polycrystalline diamond elements must then be mounted in precise locations, at precise alignments and at precisely prescribed heights or exposures to ensure mated sliding engagement. The goal in such components is full-face contact of the polycrystalline diamond elements as bearing areas. Thus, the processes used to prepare such polycrystalline diamond elements are expensive and time consuming, with significant opportunities for variance resulting in scrapped parts. Failures in alignment and/or exposure are likely to produce so called "edge clashing" as the polycrystalline diamond elements rotate against each other producing fractured elements and ultimately resulting in bearing failure.

Less expensive radial bearings utilizing polycrystalline diamond have been proposed where a nearly full circumferential array of contoured polycrystalline diamond elements are mounted on a rotor with superhard material mounted on the stator. Although this approach requires fewer polycrystalline diamond elements than the previously described approaches, it still requires contouring of the rotor mounted elements. In addition, such so called superhard materials tend to be more brittle and prone to impact damage than the diamond reactive materials disclosed herein.

Additional significant references that inform the background of the technology of this application are from the International Journal of Machine Tools & Manufacture 46 and 47 titled "Polishing of polycrystalline diamond by the technique of dynamic friction, part 1: Prediction of the interface temperature rise" and "Part 2, Material removal mechanism" 2005 and 2006. These references report on the dynamic friction polishing of PDC faces utilizing dry sliding contact under load with a carbon attractive steel disk. Key findings in these references indicate that polishing rate is more sensitive to sliding rate than load and that the rate of thermo-chemical reaction between the steel disk and the diamond surface reduces significantly as the surface finish of the diamond surface improves. The authors reference Iwai, Manabu & Uematsu, T & Suzuki, K & Yasunaga, N. (2001). "High efficiency polishing of PCD with rotating metal disc." Proc. of ISAAT2001. 231-238. which concludes that the thermo-chemical reaction between the steel disk and the PDC face does not occur at sliding speeds below 10.5 m/s at a pressure of 27 MPa. These references are incorporated herein by reference, as if set out in full. Copper and titanium were not typically listed in the early General Electric documentation on diamond synthesis but have been added later. Relevant references include "Diamond Synthesis from Graphite in the Presence of Water and $SiO_2$"; Dobrzhinetskaya and Green, II International Geology Review Vol. 49, 2007 and "Non-metallic catalysts for diamond synthesis under high pressure and high temperature", Sun et al, Science in China August 1999.

BRIEF SUMMARY

Some aspects of the present disclosure include a radial bearing assembly that includes polycrystalline diamond elements. Each polycrystalline diamond element includes an engagement surface that is in sliding engagement with an opposing engagement surface. The opposing engagement surface is formed of or includes at least some diamond reactive material.

Other aspects of the present disclosure include a method of interfacing engagement between components, including between rotors and stators. The method includes providing a radial bearing assembly that includes polycrystalline diamond elements, with each polycrystalline diamond element having an engagement surface. The method includes interfacing engagement between a rotor and a stator with the polycrystalline diamond elements, such that the engagement surfaces are in sliding engagement with an opposing engagement surface that includes at least some diamond reactive material.

Further aspects of the present disclosure include a method of designing a radial bearing assembly for a rotor and stator. The radial bearing assembly includes polycrystalline diamond elements, with each polycrystalline diamond element including an engagement surface in sliding engagement with an opposing engagement surface that is formed of or contains at least some diamond reactive material. The method includes determining if the maximum sliding speed of the rotor and stator is less than a preset limit (e.g. 10.5 m/s). If the maximum sliding speed is less than the preset limit, the method includes selecting a configuration of the radial bearing assembly within the stator and rotor. The method includes calculating a maximum contact pressure per polycrystalline diamond element based on a selected number of polycrystalline diamond elements in the selected configuration of the radial bearing assembly within the stator and rotor and based on anticipated load. The calculated maximum contact pressure is optionally multiplied by a safety factor. The method includes determining if the calculated maximum contact pressure, optionally multiplied by the safety factor, is below a preset maximum allowable pressure. If the calculated maximum contact pressure is determined to be below the preset maximum allowable pressure, the method includes deploying at least a minimum number of the polycrystalline diamond elements on the selected configuration of the radial bearing assembly within the stator and rotor. If the number of the polycrystalline diamond elements fit on the selected configuration of the radial bearing assembly within the stator and rotor, the method includes making the assembly of the radial bearing assembly, rotor, and stator.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Figure 1:
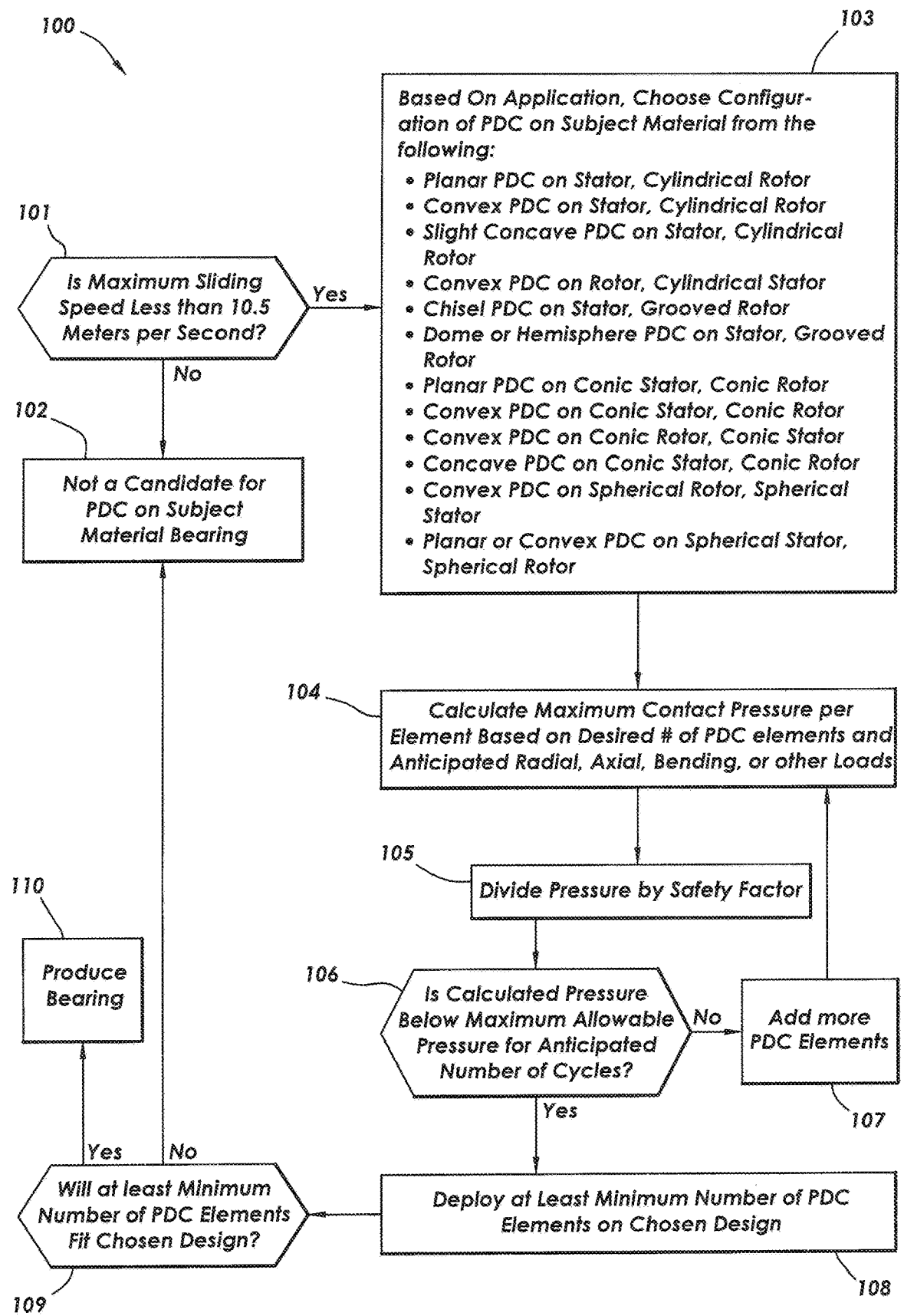
FIG. 1 is a flow chart showing generalized evaluation criteria for the use of the technology disclosed herein.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include radial bearings and radial bearing assemblies, as well apparatus and systems including the same, and to methods of use thereof. For convenience, the following descriptions present an outer stator component and an inner rotor component. However, it would be understood by one skilled in the art that, in each of the exemplary embodiments disclosed herein, the inner component may be held static and the outer component may be rotated. Additionally, it would be understood by one skilled in the art that, although the descriptions of the disclosure are directed to rotor and stator configurations, the technology disclosed herein is not limited to such applications and may be applied in various other applications including discrete bearings with an inner and outer race where the outer and inner races both rotate or where either one or the other of the outer and inner races is held stationary.

Diamond Reactive Materials

As used herein, a "diamond reactive material" is a material that contains more than trace amounts of diamond catalyst or diamond solvent. As used herein, a diamond reactive material that contains more than "trace amounts" of diamond catalyst or diamond solvent, contains at least 2 percent by weight (wt. %) diamond catalyst or diamond solvent. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond catalyst or diamond solvent. As used herein, a "diamond catalyst" is a chemical element, compound, or material capable of catalyzing graphitization of polycrystalline diamond, such as under load and at a temperature at or exceeding the graphitization temperature of diamond (i.e., about 700° C. or 973.15 K). As used herein, a "diamond solvent" is a chemical element, compound, or material capable of solubilizing polycrystalline diamond, such as under load and at a temperature at or exceeding the graphitization temperature of diamond. Thus, diamond reactive materials include materials that, under load and at a temperature at or exceeding the graphitization temperature of diamond, can lead to wear, sometimes rapid wear, and failure of components formed of or including polycrystalline diamond, such as diamond tipped tools.

Diamond reactive materials include, but are not limited to, metals, metal alloys, and composite materials that contain more than trace amounts of diamond catalyst or solvent elements. In some aspects, the diamond reactive materials are in the form of hardfacings, coatings, or platings. For example, and without limitation, the diamond reactive material may be ferrous, cobalt, nickel, ruthenium, rhodium, palladium, chromium, manganese, copper, titanium, tantalum, or alloys thereof. In some aspects, the diamond reactive material is a superalloy including, but not limited to, iron-based, cobalt-based and nickel-based superalloys. In certain aspects, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, superhard materials include materials that are at least as hard as tungsten carbide tiles and/or cemented tungsten carbide, such as is determined in accordance with one of these hardness scales, such as the Brinell scale. One skilled in the art would understand that a Brinell scale test may be performed, for example, in accordance with ASTM E10-14; the Vickers hardness test may be performed, for example, in accordance with ASTM E384; the Rockwell hardness test may be performed, for example, in accordance with ASTM E18; and the Knoop hardness test may be performed, for example, in accordance with ASTM E384. The "superhard materials" disclosed herein include, but are not limited to, tungsten carbide (e.g., tile or cemented), infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale.

Interfacing Polycrystalline Diamond with Diamond Reactive Materials

In some aspects, the present disclosure provides for interfacing the engagement between a rotor and stator with a polycrystalline diamond element in contact with a diamond reactive material. For example, the polycrystalline diamond element may be positioned and arranged on the stator for sliding contact with the rotor, where the rotor is formed of or includes at least some diamond reactive material. Alternatively, the polycrystalline diamond element may be positioned and arranged on the rotor for sliding contact with the stator, where the stator is formed of or includes at least some diamond reactive material. The polycrystalline diamond element may have an engagement surface for engagement with an opposing engagement surface of the diamond reactive material. As used herein, "engagement surface" refers to the surface of a material (e.g., polycrystalline diamond or diamond reactive materials) that is positioned and arranged within a bearing assembly such that, in operation of the bearing assembly, the engagement surface interfaces the contact between the two components (e.g., between the stator and the rotor). The "engagement surface" may also be referred to herein as the "bearing surface".

In some aspects the opposing engagement surface includes or is composed of at least 2 wt. % of diamond reactive material, or from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond reactive material.

In certain applications, the polycrystalline diamond element, or at least the engagement surface thereof, is lapped or polished, optionally highly lapped or highly polished. Although highly polished polycrystalline diamond elements are preferred in at least some applications, the scope of this disclosure is not limited to highly polished polycrystalline diamond elements and includes polycrystalline diamond elements that are highly lapped or polished. As used herein, a surface is defined as "highly lapped" if the surface has a surface finish of 20 μin (about 0.51 microns) or about 20 μin (about 0.51 microns), such as a surface finish ranging from about 18 (about 0.46 microns) to about 22 μin (about 0.56 microns). As used herein, a surface is defined as "polished" if the surface has a surface finish of less than about 10 μin (about 0.25 microns), or of from about 2 (about 0.05 microns) to about 10 μin (about 0.46 microns). As used herein, a surface is defined as "highly polished" if the surface has a surface finish of less than about 2 μin (about 0.05 microns), or from about 0.5 μin (about 0.01 microns) to less than about 2 μin (about 0.05 microns). In some aspects, engagement surface 101 has a surface finish ranging from 0.5 μin (about 0.01 microns) to 40 μin (about 1.02 microns), or from 2 μin (about 0.05 microns) to 30 μin (about 0.76 microns), or from 5 μin (about 0.13 microns) to 20 pin (about 0.51 microns), or from 8 μin (about 0.20 microns) to 15 μin (about 0.38 microns), or less than 20 μin (about 0.51 microns), or less than 10 μin (about 0.46 microns), or less than 2 μin (about 0.05 microns), or any range therebetween. Polycrystalline diamond that has been polished to a surface finish of 0.5 μin (about 0.01 microns) has a coefficient of friction that is about half of standard lapped polycrystalline diamond with a surface finish of 20-40 μin (about 0.51-1.02 microns). U.S. Pat. Nos. 5,447,208 and 5,653,300 to Lund et al., the entireties of which are incorporated herein by reference, provide disclosure relevant to polishing of polycrystalline diamond. As would be understood by one skilled in the art, surface finish may be measured with a profilometer or with Atomic Force Microscopy.

Table 1, below, sets for a summary of coefficients of friction for various materials, including polished polycrystalline diamond, in both a dry, static state and a lubricated, static state, where the "first material" is the material that is moved relative to the "second material" to determine the CoF of the first material.

TABLE 1*

| First Material | Second Material | Dry Static | Lubricated Static |
|---|---|---|---|
| Hard Steel | Hard Steel | 0.78 | 0.05-0.11 |
| Tungsten Carbide | Tungsten Carbide | 0.2-0.25 | 0.12 |
| Diamond | Metal | 0.1-0.15 | 0.1 |
| Diamond | Diamond | 0.1 | 0.05-0.1 |
| Polished PDC | Polished PDC | Estimated 0.08-1 | Estimated 0.05-0.08 |

TABLE 1*-continued

| First Material | Second Material | Dry Static | Lubricated Static |
|---|---|---|---|
| Polished PDC | Hard Steel | Estimated 0.08-0.12 | Estimated 0.08-0.1 |

*References include Machinery's Handbook; Sexton T N, Cooley C H. Polycrystalline diamond thrust bearings for down-hole oil and gas drilling tools. Wear 2009; 267: 1041-5.

Evaluation Criteria

FIG. 1 depicts flow chart 100 of an emblematic generalized set of evaluation criteria for the use of the technology of this application in a dry, non-lubricated environment. As indicated by box 101, first it is evaluated if the maximum sliding speed in an application is less than 10.5 m/s. As used herein the "sliding speed", also referred to as the "sliding interface speed", is the speed with which two components in contact move relative to one another (e.g., the speed at which a rotor, in contact with a stator, moves relative to the stator).

If it is determined that the maximum sliding speed is not be less than 10.5 m/s, then, as indicated by box 102, it is determined that the evaluated application is not a candidate for use of a polycrystalline diamond element is sliding engagement with a diamond reactive material because the sliding speed is too high. One skilled in the art would understand that, in a lubricated or wet environment, the sliding interface speed can be significantly higher than in a dry, non-lubricated environment (as is herein evaluated).

If it is determined that the maximum sliding speed is less than 10.5 m/s, then, as indicated by box 103, the configuration (e.g., shape, size, and arrangement) of the polycrystalline diamond element is selected depending on the particular application at hand. Box 103 sets forth various non-limiting polycrystalline diamond element configurations for sliding engagement with diamond reactive materials in various bearing configurations. For example, a planar polycrystalline diamond element may be selected for use on a stator that is engaged with a cylindrical rotor formed of or including at least some diamond reactive material; a convex polycrystalline diamond element may be selected for use on a stator that is engaged with a cylindrical rotor formed of or including at least some diamond reactive material; a polycrystalline diamond element having a concave, or at least slightly concave, surface may be selected for use on a stator that is engaged with a cylindrical rotor formed of or including at least some diamond reactive material; a polycrystalline diamond element having a convex, or at least slightly convex, surface may be selected for use on a rotor that is engaged with a cylindrical stator formed of or including at least some diamond reactive material; a chisel shaped polycrystalline diamond element may be selected for use on a stator that is engaged with a grooved rotor formed of or including at least some diamond reactive material; a dome or hemisphere shaped polycrystalline diamond element may be selected for use on a stator that is engaged with a grooved rotor formed of or including at least some diamond reactive material; a planar polycrystalline diamond element may be selected for use on a conic shaped stator that is engaged with a conic shaped rotor formed of or including at least some diamond reactive material; a polycrystalline diamond element having a convex, or at least slightly convex, surface may be selected for use on a conic shaped stator that is engaged with a conic shaped rotor formed of or including at least some diamond reactive material; a polycrystalline diamond element having a convex, or at least slightly convex, surface may be selected for use on a conic shaped rotor that is engaged with a conic shaped stator formed of or including at least some diamond reactive material; a polycrystalline diamond element having a concave, or at least slightly concave, surface may be selected for use on a conic shaped stator that is engaged with a conic shaped rotor formed of or including at least some a diamond reactive material; a polycrystalline diamond element having a convex, or at least slightly convex, surface may be selected for use on a spherical shaped rotor that is engaged with a spherical shaped stator formed of or including at least some diamond reactive material; or a polycrystalline diamond element having a planar, convex, or at least slightly convex surface may be selected for use on a spherical shaped stator that is engaged with a spherical shaped rotor formed of or including at least some diamond reactive material. One skilled in the art would understand that the present disclosure is not limited to these particular selected shapes and contours, and that the shapes, including surface contouring, of the rotors, stators, polycrystalline diamond elements, and other application specific components may vary depending on the particular application.

After selecting the configuration, as set forth in box 103, the maximum contact pressure per polycrystalline diamond element is calculated. As set forth in box 104, the maximum contact pressure per polycrystalline diamond element is calculated based on the number of polycrystalline diamond elements and the anticipated load, including radial, axial, bending, or other loads. The maximum contact pressure may be determined by methods known to those skilled in the art.

After calculation of the maximum contact pressure per polycrystalline diamond element, the calculated maximum pressure per polycrystalline diamond element is divided by a safety factor, as set forth in box 105. The application of the safety factor, over and above the maximum pressure determined in box 104, may be set and applied at the discretion of a designer, for example. Thus, the safety factor, if applied, provides for a reduced pressure per polycrystalline diamond element relative to the maximum contact pressure per polycrystalline diamond element.

In box 106, it is determined whether the calculated maximum pressure is below maximum allowable pressure for anticipated cycles of the apparatus. As would be understood by those skilled in the art, the fatigue on the diamond reactive material is the limiting factor. The load is at the diamond/diamond reactive material (e.g., metal) interface. The more the PDC elements in an assembly, the lower the instant load on the metal. S-N curves (contact stress to cycles) can be used to facilitate making the determination in box 106.

If, per box 106, it is determined that the calculated pressure is not below the maximum allowable pressure, then, as indicated in box 107, additional polycrystalline diamond elements are deployed to the design configuration that was selected in box 103. After these additional polycrystalline diamond elements are deployed, the thus modified design configuration is evaluated per boxes 104 and 105 before being, once again, assessed per the criteria of box 106.

If, per box 106, it is determined that the calculated pressure is below the maximum allowable pressure, then, as indicated in box 108, the proposed design configuration is then created by deploying at least the minimum number of polycrystalline diamond elements indicated as required by the prior boxes 101-106 onto the components of the chosen design configuration of box 103 (e.g., attaching the minimum number of polycrystalline diamond elements onto the stator or rotor).

At box 109, it is determined whether the minimum number of polycrystalline diamond elements, per box 108, will fit on the chosen configuration of box 103. If it is determined that, the minimum number of polycrystalline diamond elements will fit on the chosen configuration of box 103, then the bearing assembly in the rotor and stator is produced, as shown in box 110. If it determined that the minimum number of polycrystalline diamond elements will not fit on the chosen configuration of box 103, then the chosen configuration of box 103 is determined to not be a candidate for use of a polycrystalline diamond element in sliding engagement with a diamond reactive material, per box 102.

The designer of the bearing configuration would also have the option (not shown) of choosing an alternative bearing configuration from box 103 if the required minimum number of polycrystalline diamond elements will not fit on the originally chosen design configuration. Alternatively, the safety factor can be lowered to reduce the minimum number of polycrystalline diamond elements required. One skilled in the art would understand that the criteria set forth in FIG. 1 is exemplary only, that other criteria may be evaluated depending on the particular application, and that, for at least some applications, some of the criteria set forth in FIG. 1 may be left out without departing from the scope of this disclosure.

Various exemplary rotor and stator radial bearing assemblies will now be described with reference to FIGS. 2A-13B. In FIGS. 2A-13B, like reference numerals refer to like elements. For example, an exemplary assembly is identified with reference numeral "200" in FIGS. 2A and 2B and is identified with reference numeral "300" in FIGS. 3A and 3B.

Stator with Planar Polycrystalline Diamond Element

Figure 2A:
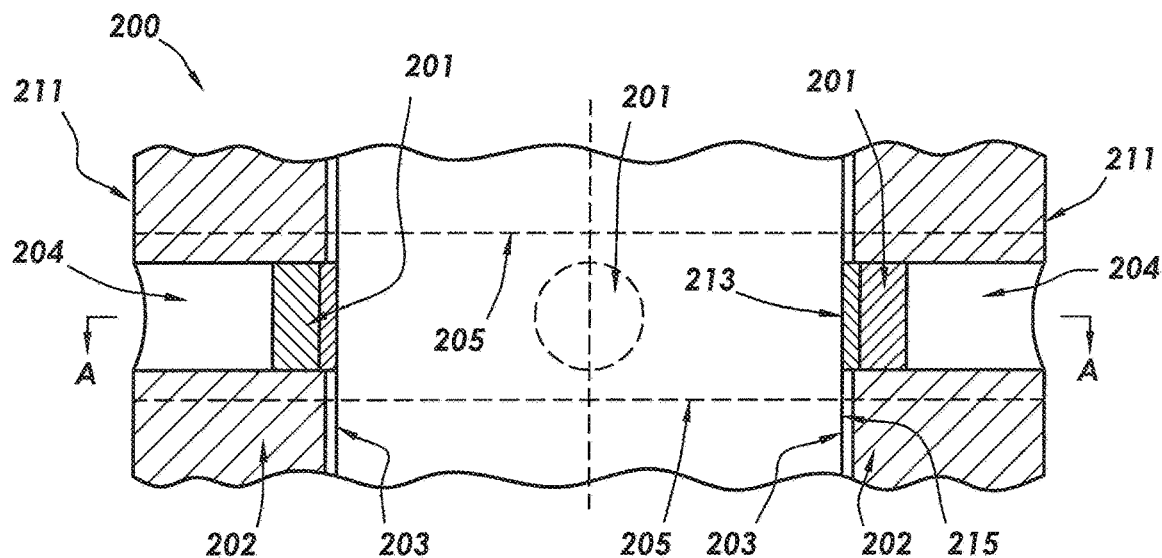
FIG. 2A is a partial side view of a rotor and stator radial bearing assembly of an embodiment of the technology of this application.
Figure 2B:
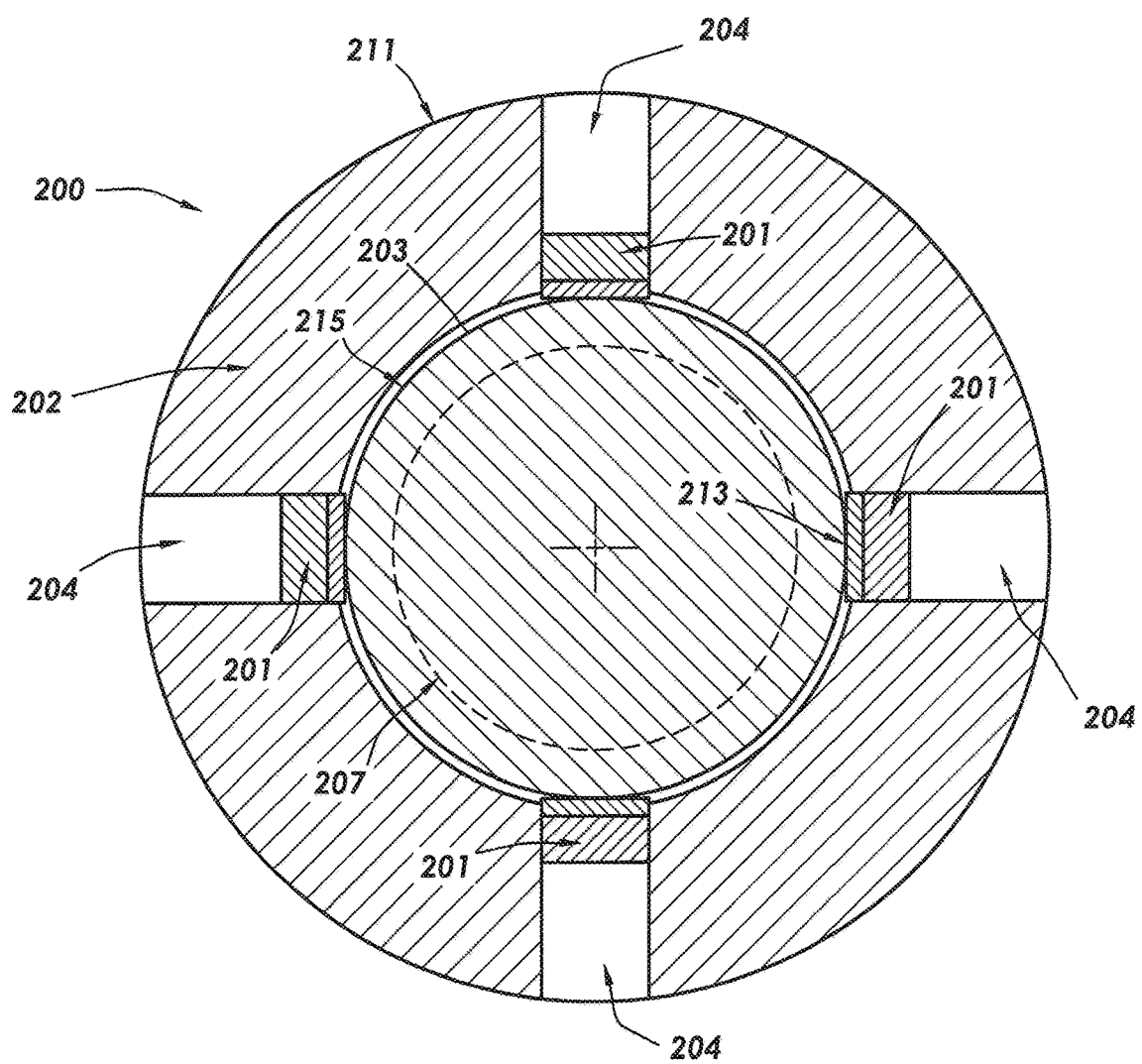
FIG. 2B is a cross-sectional view of the rotor and stator radial bearing assembly of FIG. 2A taken along line A-A.

FIG. 2A is a partial side view of a rotor and stator radial bearing assembly, and FIG. 2B is a cross-sectional view of the rotor and stator radial bearing assembly of FIG. 2A taken along line A-A. With reference to both FIGS. 2A and 2B, rotor and stator radial bearing assembly 200 will be described.

Rotor and stator radial bearing assembly 200 includes stator 202 engaged with rotor 203. Four planar polycrystalline diamond elements 201 are fitted into stator 202 to provide for sliding engagement between stator 202 and rotor 203, where rotor 203 is formed of or includes at least some diamond reactive material. Polycrystalline diamond elements 201 are deployed (e.g., mechanically fitted) in stator 202 within loading ports 204, which are ports formed in and/or positioned within stator body 211. For example, and without limitation, each polycrystalline diamond element 201 may be press fit, glued, brazed, threaded, or otherwise mounted on stator 202 (or rotor in other applications) via methods known to those skilled in the art. One skilled in the art would understand that the present disclosure is not limited to these particular attachment methods or to the use of ports within the stator body, and that the polycrystalline diamond elements may be attached to the stator or rotor by any of a variety of methods. Further, while shown as including equally spaced, planar polycrystalline diamond elements, one skilled in the art would understand that the number, spacing, armament, shape, and size of the polycrystalline diamond elements may vary depending upon any number of various design criteria including, but not limited to, the criteria set forth in FIG. 1. In some aspects, polycrystalline diamond elements are composed of thermally stable polycrystalline diamond, either supported or unsupported by tungsten carbide, or polycrystalline diamond compact.

Each polycrystalline diamond element 201 includes an engagement surface 213 (here shown as planar surfaces), and rotor 203 includes opposing engagement surface 215. Polycrystalline diamond elements 201 are positioned on stator 202 in secure contact with rotor 203, to limit lateral movement of rotor 203 while allowing for free sliding rotation of rotor 203 during operation. Polycrystalline diamond elements 201 are positioned and arranged such that engagement surfaces 213 are in contact (e.g., sliding contact) with opposing engagement surface 215. Thus, engagement surfaces 213 and opposing engagement surface 215 interface the sliding contact between rotor 203 and stator 202.

FIGS. 2A and 2B depict a rotor and stator such as would be used in a downhole pump or motor. However, one skilled in the art would understand that radial bearings for other applications, as well as discrete radial bearings, may be designed and manufactured in the same or similar manner in accordance with this disclosure. Non-limiting proximal and distal dimensions for such a discrete bearing are indicated by dashed lines 205 shown in FIG. 2A. As shown in FIG. 2B, optionally, a through bore 207 is provided in rotor 203, which could be used in a discrete bearing, for example. As is evident in FIG. 2B, polycrystalline diamond elements 201 are deployed in stator 202 to radially support and provide sliding engagement with rotor 203.

Although FIGS. 2A and 2B depict an assembly that includes four polycrystalline diamond elements 201, one skilled in the art would understand that less than four polycrystalline diamond elements, such as three polycrystalline diamond elements, or more than four polycrystalline diamond elements may be used depending on the particular application and configuration, such as the space available such polycrystalline diamond elements on the stator or rotor. Further, although FIGS. 2A and 2B show a single circumferential set of polycrystalline diamond elements 201, it would be understood by those skilled in the art that one or more additional circumferential sets of polycrystalline diamond elements may be deployed in the stator (or rotor) to increase lateral support and lateral load taking capability of the bearing assembly.

Stator with Convex Polycrystalline Diamond Element

Figure 3A:
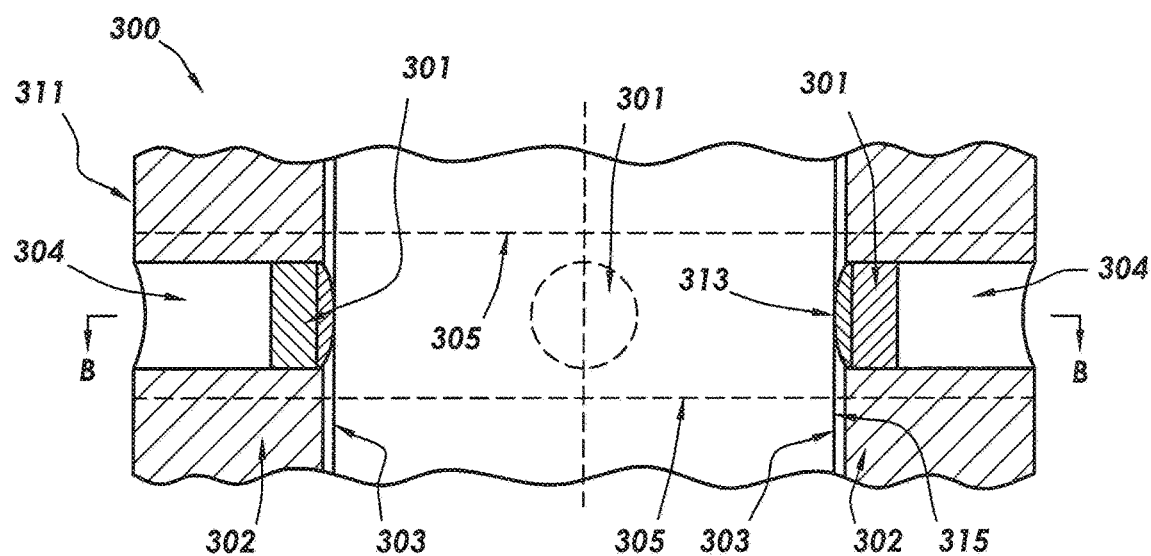
FIG. 3A is a partial side view of a rotor and stator radial bearing assembly of an embodiment of the technology of this application.
Figure 3B:
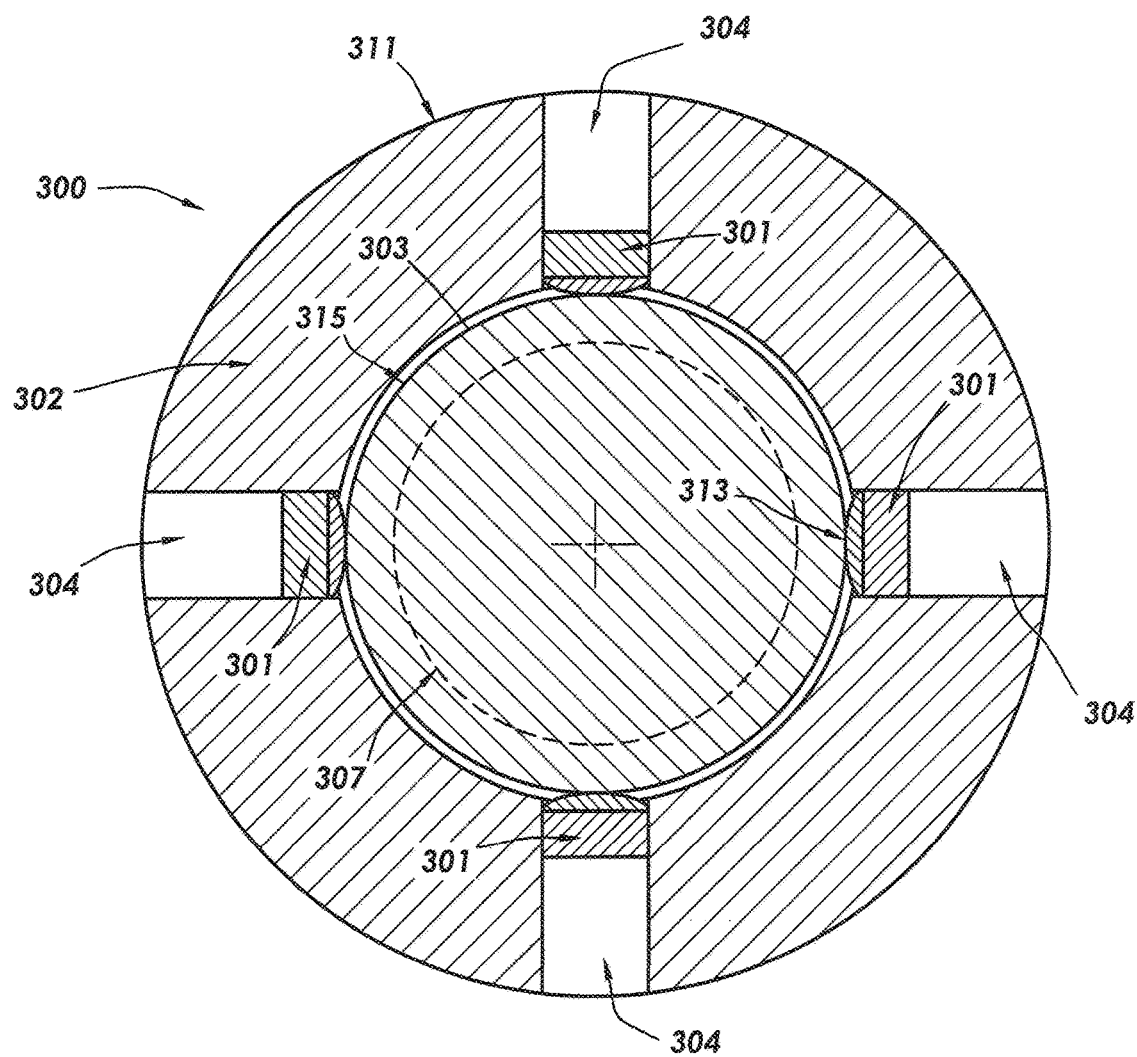
FIG. 3B is a cross-sectional view of the assembly of FIG. 3A taken along line B-B.

FIGS. 3A and 3B depict rotor and stator radial bearing assembly 300, which is substantially similar to that of FIGS. 2A and 2B, with the exception that polycrystalline diamond elements 301 have convex engagement surfaces 313 rather than the flat, planar engagement surfaces of FIGS. 2A and 2B.

With reference to FIGS. 3A and 3B, rotor and stator radial bearing 300 includes convex polycrystalline diamond elements 301 fitted into stator body 311 of stator 302 to provide for sliding engagement with rotor 303, formed of or including at least some diamond reactive material. Polycrystalline diamond elements 301 are deployed in stator 302 through loading ports 304, and may be press fit, glued, brazed, threaded, or otherwise mounted using methods known to those skilled in the art. Polycrystalline diamond elements 301 are placed into a secure contacting position with rotor 303 to limit lateral movement of rotor 303 while allowing for free sliding rotation of rotor 303 during operation. As is evident from FIG. 3B, polycrystalline diamond elements 301 are deployed in stator 302 to radially support and provide sliding engagement with rotor 303. FIG. 3B also shows optional through bore 307 such as could be used in a discrete bearing.

Although FIGS. 3A and 3B depict a rotor and stator such as would be used in a downhole pump or motor, other assemblies, including discrete radial bearing assemblies, may be designed and manufactured in the same or substantially the same way. Non-limiting proximal and distal dimensions for such a discrete bearing are indicated by dashed lines 305. Further, although FIGS. 3A and 3B show four polycrystalline diamond elements 301, it would be understood by those skilled in the art that fewer (e.g., three) or more polycrystalline diamond elements may be deployed in stator 302. Additionally, although FIGS. 3A and 3B show a single circumferential set of polycrystalline diamond elements 301, it would be understood by those skilled in the art that one or more additional circumferential sets of polycrystalline diamond elements may be deployed in the stator to increase lateral support and lateral load taking capability of the bearing assembly.

As with assembly 200, in operation engagement surface 313 interfaces with opposing engagement surface 315 to bear load between rotor 303 and stator 302.

Stator with Concave Polycrystalline Diamond Element

Figure 4A:
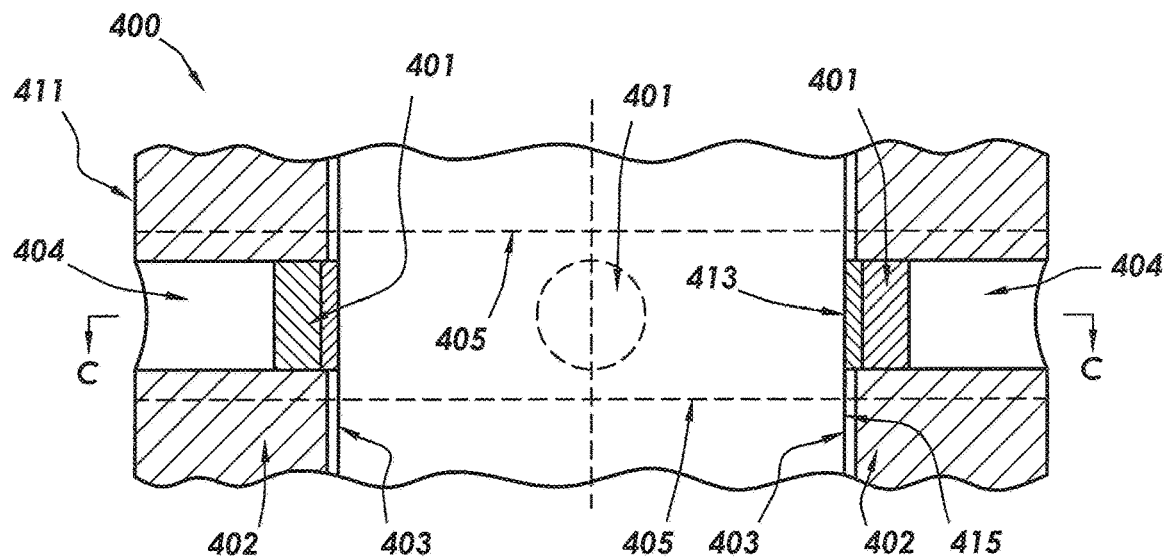
FIG. 4A is a partial side view of a rotor and stator radial bearing assembly of an embodiment of the technology of this application.
Figure 4B:
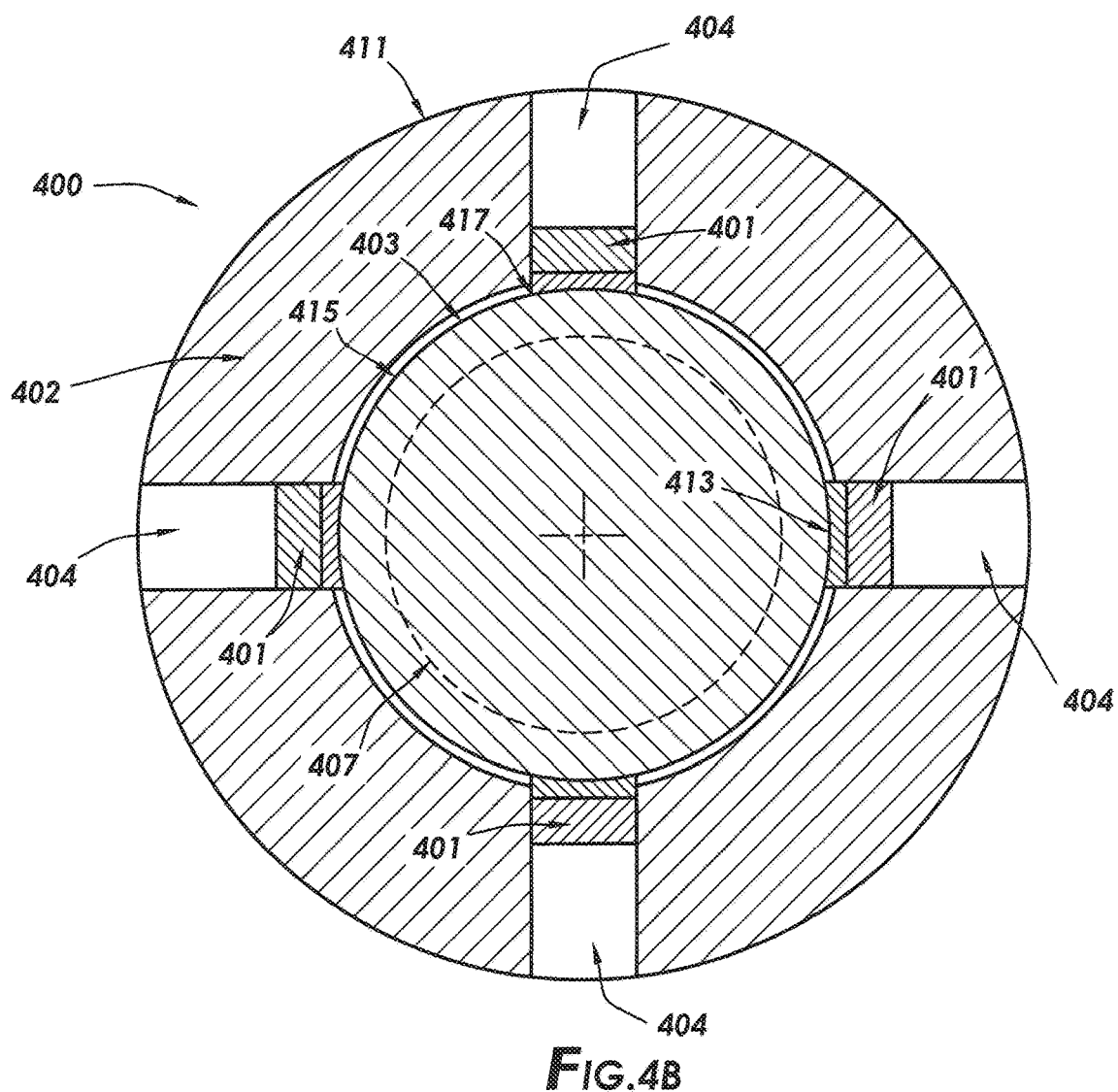
FIG. 4B is a cross-sectional view of the assembly of FIG. 4A taken along line C-C.

FIGS. 4A and 4B depict rotor and stator radial bearing assembly 400, which is substantially similar to that of FIGS. 2A-3B, with the exception that polycrystalline diamond elements 401 has concave, or at least slightly concave, engagement surfaces 413 rather than the flat, planar engagement surfaces of FIGS. 2A and 2B or the convex engagement surfaces of FIGS. 3A and 3B.

Slightly concave polycrystalline diamond elements 401 are fitted into stator body 411 of stator 402 to provide for sliding engagement with rotor 403. Polycrystalline diamond elements 401 are deployed in stator 402 through loading ports 404. Polycrystalline diamond elements 401 may be press fit, glued, brazed, threaded, or otherwise mounted using methods known to those skilled in the art. Polycrystalline diamond elements 401 are placed into secure contacting position with rotor 403 to limit lateral movement of rotor 403 while allowing for free sliding rotation of rotor 403 during operation.

As with assembly 300, in operation engagement surface 413 interfaces with opposing engagement surface 415 to bear load between rotor 403 and stator 402. The at least slight concavity of each polycrystalline diamond element 401 is oriented with the axis of the concavity, in line with the circumferential rotation of rotor 403; thereby ensuring no edge contact between polycrystalline diamond elements 401 and rotor 403 and providing for linear area contact between polycrystalline diamond elements 401 and rotor 403, generally with the deepest portion of the concavity. That is, engagement between polycrystalline diamond elements 401 and rotor 403 is exclusively interfaced by engagement surface 413 and opposing engagement surface 415, such that edge or point 417 of polycrystalline diamond elements 401 do not make contact with rotor 403. As such, only linear area contact, and no edge or point contact, occurs between polycrystalline diamond elements 401 and rotor 403. As is evident from FIG. 4B, polycrystalline diamond elements 401 are deployed in stator 402 to radially support and provide sliding engagement with rotor 403. FIG. 4B also shows optional through bore 407 such as could be used in a discrete bearing.

Although FIGS. 4A and 4B depict a rotor and stator such as would be used in a downhole pump or motor, assemblies, including a discrete radial bearing assembly, may be designed and manufactured in the same or substantially the same way. Non-limiting proximal and distal dimensions for such a discrete bearing are indicated by dashed lines 405. Further, although FIGS. 4A and 4B show four polycrystalline diamond elements 401, it would be understood by those skilled in the art that fewer (e.g., three) or more polycrystalline diamond elements may be deployed in stator 402. Additionally, although FIGS. 4A and 4B show a single circumferential set of polycrystalline diamond elements 401, it would be understood by those skilled in the art that one or more additional circumferential sets of polycrystalline diamond elements may be deployed in the stator to increase lateral support and lateral load taking capability of the bearing assembly.

Rotor with Convex Polycrystalline Diamond Element

Figure 5A:
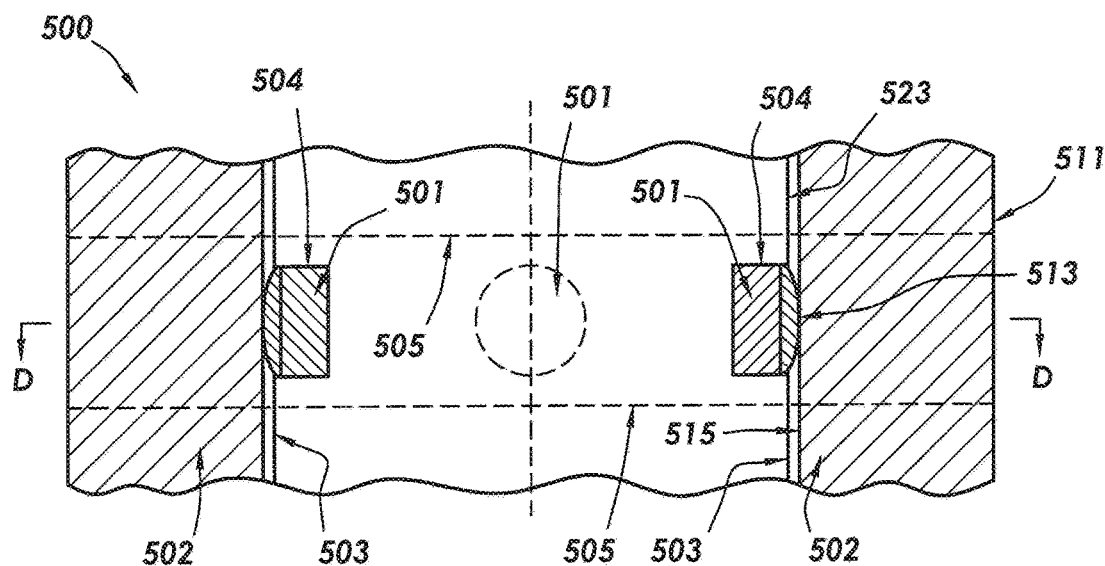
FIG. 5A is a partial side view of a rotor and stator radial bearing assembly of an embodiment of the technology of this application.
Figure 5B:
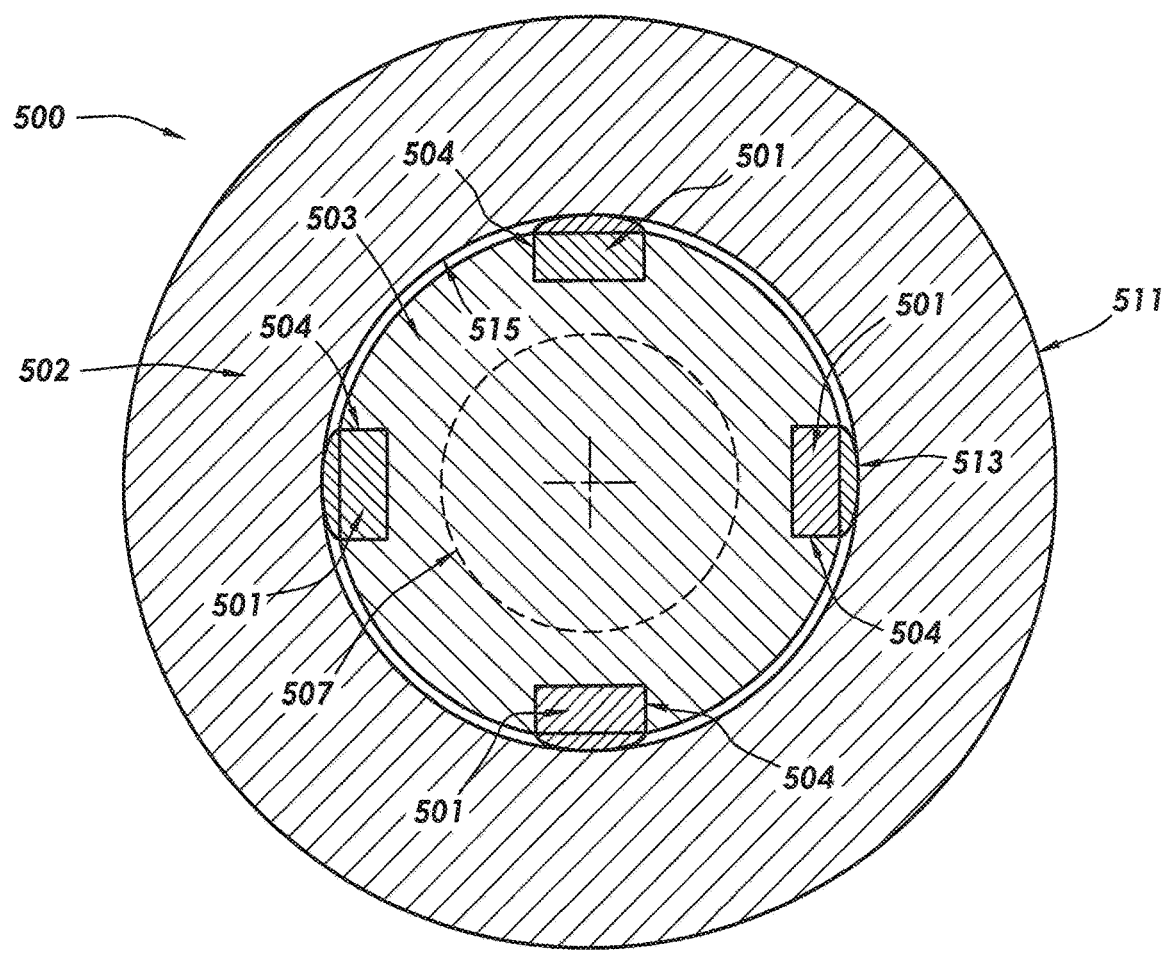
FIG. 5B is a cross-sectional view of the assembly of FIG. 5A taken along line D-D.

FIGS. 5A and 5B depict rotor and stator radial bearing assembly 500, which is substantially similar to that of FIGS. 3A and 3B, with the exception that polycrystalline diamond elements 501, having the convex, dome shaped engagement surfaces 513, are installed on rotor 503 rather than on the stator.

Convex polycrystalline diamond elements 501 are fitted into rotor body 523 of rotor 503 to provide for sliding engagement with stator 502, which is formed of or includes at least some diamond reactive material. Polycrystalline diamond elements 501 are deployed in rotor 503 in sockets 504 formed into and/or positioned in rotor body 523. Polycrystalline diamond elements 501 may be press fit, glued, brazed, threaded, or otherwise mounted using methods known to those skilled in the art. Polycrystalline diamond elements 501 are placed into a secure contacting position relative to stator 502 to limit lateral movement of rotor 503 while allowing for free sliding rotation of rotor 503 during operation. As is evident from FIG. 5B, polycrystalline diamond elements 501 are deployed in rotor 503 to radially support and provide sliding engagement with stator 502. FIG. 5B also shows optional through bore 507 such as could be used in a discrete bearing.

Although FIGS. 5A and 5B depict a rotor and stator such as would be used in a downhole pump or motor, other assemblies, including a discrete radial bearing assembly, may be designed and manufactured in the same or similar way. Non-limiting proximal and distal dimensions for such a discrete bearing are indicated by dashed lines 505. Further, although FIGS. 5A and 5B show four polycrystalline diamond elements 501, one skilled in the art would understand that fewer (e.g., three) or more polycrystalline diamond elements may be deployed in rotor 503. Additionally, although FIGS. 5A and 5B show a single circumferential set of polycrystalline diamond elements 501, it would be understood by one skilled in the art that one or more additional circumferential sets of polycrystalline diamond elements may be deployed in the rotor to increase lateral support and lateral load taking capability of the bearing assembly.

Thus, contrary to the embodiments shown in FIGS. 2A-4B, in the embodiment shown in FIGS. 5A and 5B, the engagement surfaces 513 are on the rotor 503, and the opposing engagement surface 515 is on the stator 502.

Stator with Chisel Shaped Polycrystalline Diamond Element

Figure 6A:
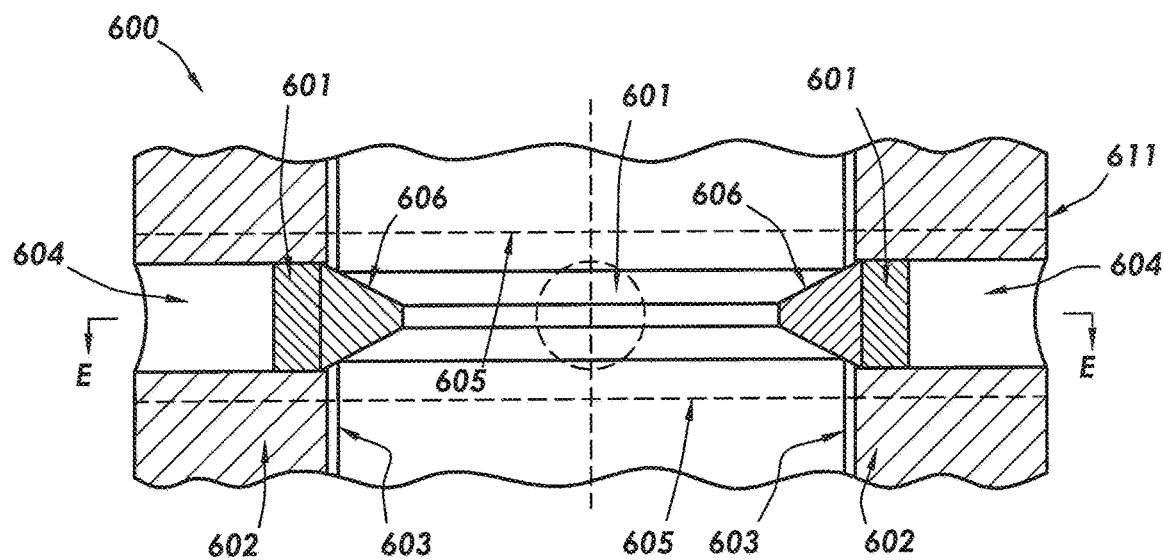
FIG. 6A is a partial side view of a rotor and stator radial bearing assembly of an embodiment of the technology of this application.
Figure 6B:
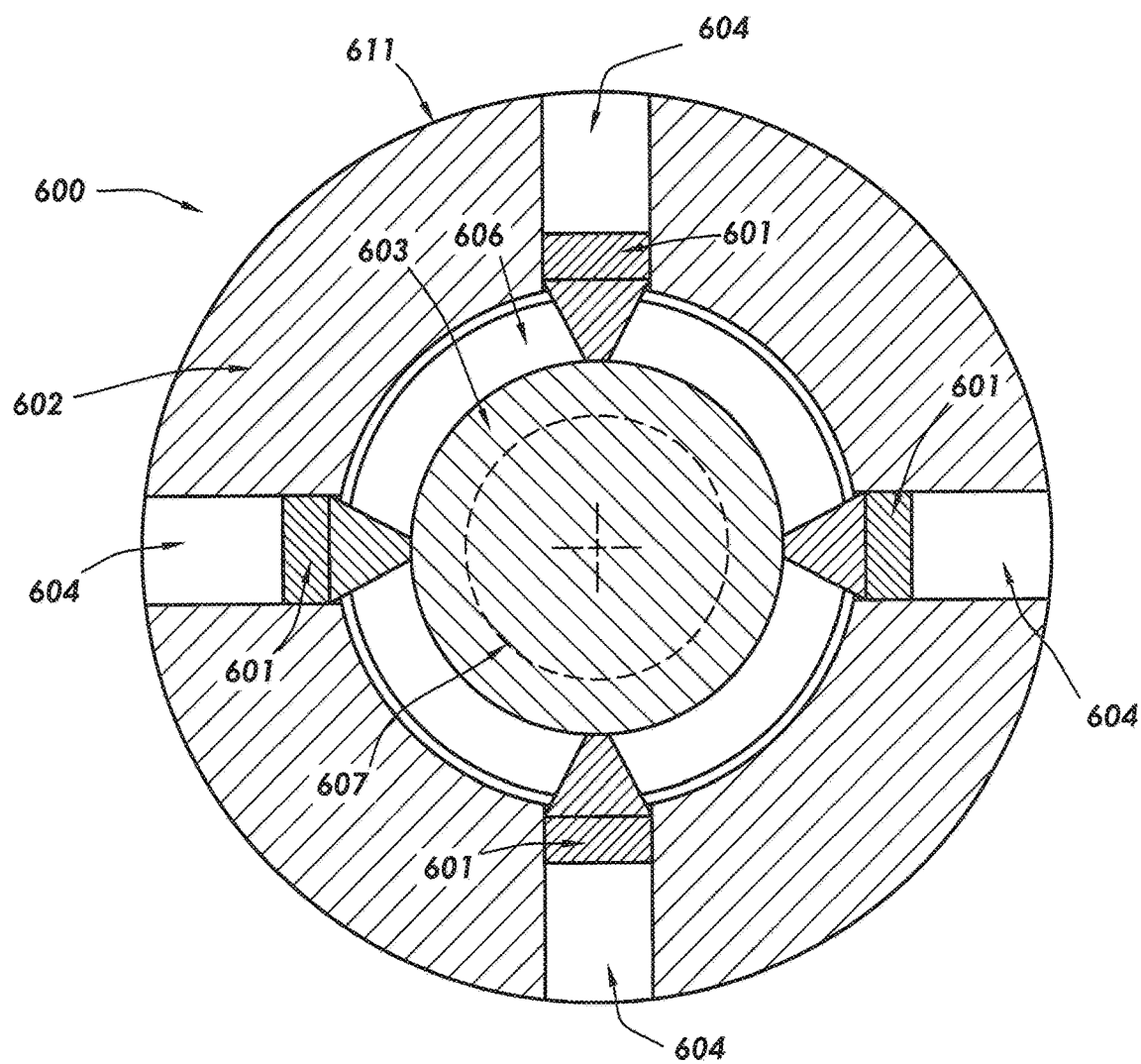
FIG. 6B is a cross-sectional view of the assembly of FIG. 6A taken along line E-E.

FIGS. 6A and 6B depict rotor and stator radial bearing assembly 600 with chisel shaped polycrystalline diamond elements 601 fitted into stator body 611 of stator 602 to provide for sliding engagement with rotor 603, which is formed of or includes at least some diamond reactive material. Polycrystalline diamond elements 601 are deployed in stator 602 through loading ports 604, which are formed in and/or positioned in stator body 611. Polycrystalline diamond elements 601 may be press fit, glued, brazed, threaded, or otherwise mounted using methods known to those skilled in the art.

Polycrystalline diamond elements 601 are placed into a secure contacting position within radial/thrust surface groove 606 of rotor 603 to limit lateral and axial movement of rotor 603 while allowing for free sliding rotation of rotor 603 during operation. Chisel shaped polycrystalline diamond elements 601 are positioned, arranged, shaped, sized, and oriented to slidingly engage into the mating radial/thrust surface groove 606 of rotor 603. Chisel shaped polycrystalline diamond elements 601 include engagement surface (defined by the chisel shaped polycrystalline diamond elements 601), which interfaces in contact with opposing engagement surface, here the surface of radial/thrust surface groove 606. It is evident from FIG. 6B that chisel shape polycrystalline diamond elements 601 are deployed in stator 602 to radially and axially support and provide sliding engagement with rotor 603. FIG. 6B also depicts optional through bore 607 such as could be used in a discrete bearing. The embodiment shown in FIGS. 6A and 6B may further act as a rotor catch.

Although FIGS. 6A and 6B depict a rotor and stator such as would be used in a downhole pump or motor, other assemblies, including a discrete radial bearing assembly, may be designed and manufactured in the same or similar way. Non-limiting proximal and distal dimensions for such a discrete bearing are indicated by dashed lines 605. Further, although FIGS. 6A and 6B depicts four polycrystalline diamond elements 601, it would be understood by one skilled in the art that fewer (e.g., three) or more polycrystalline diamond elements 601 may be deployed in stator 602. Additionally, although FIGS. 6A and 6B depict a single circumferential set of polycrystalline diamond elements 601, it would be understood by one skilled in the art that one or more additional circumferential sets of polycrystalline diamond elements may be deployed in the stator to increase lateral and axial support and lateral and axial load taking capability of the bearing assembly.

Stator with Dome or Hemisphere Shaped Polycrystalline Diamond Element

Figure 7A:
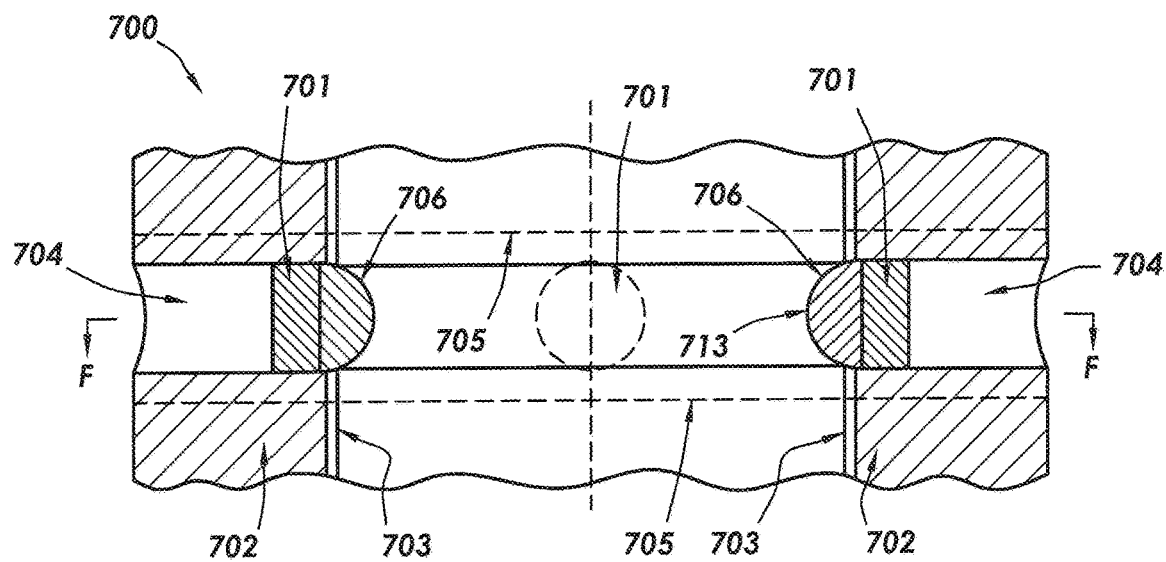
FIG. 7A is a partial side view of a rotor and stator radial bearing assembly of an embodiment of the technology of this application.
Figure 7B:
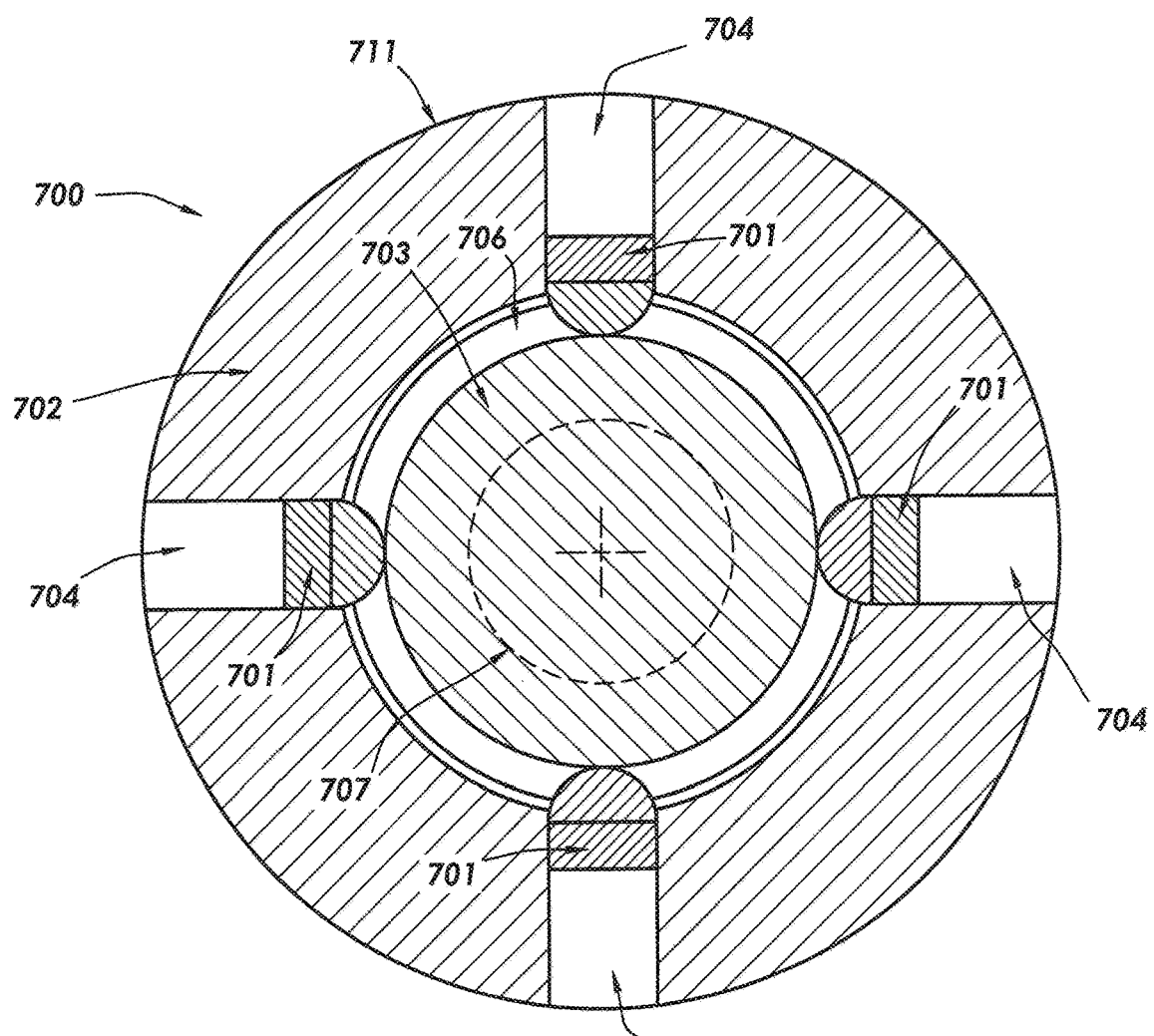
FIG. 7B is a cross sectional view of the assembly of FIG. 7A taken along line F-F.

FIGS. 7A and 7B depict rotor and stator radial bearing assembly 700, which is substantially similar to that of FIGS. 6A and 6B, with the exception that polycrystalline diamond elements 701 have dome or hemisphere shaped engagement surfaces 713 rather chisel shaped polycrystalline diamond elements.

Dome or hemisphere shaped polycrystalline diamond elements 701 are fitted into stator housing 711 of stator 702 to provide for sliding engagement with rotor 703. Polycrystalline diamond elements 701 are deployed in stator 702 through loading ports 704 formed in and/or positioned in stator body 711. Polycrystalline diamond elements 701 may be press fit, glued, brazed, threaded, or otherwise mounted using methods known to those skilled in the art. Polycrystalline diamond elements 701 are placed into a secure contacting position relative to radial/thrust surface groove 706 of rotor 703 to limit lateral and axial movement of rotor 703 while allowing for free sliding rotation of rotor 703 during operation. Dome or hemisphere polycrystalline diamond elements 701 slidingly engage the mating radial/thrust surface groove 706 of rotor 703. Dome or hemisphere polycrystalline diamond elements 701 define engagement surface, which interfaces in contact with opposing engagement surface, here the surface of radial/thrust surface groove 706. As is evident from FIG. 7B, dome or hemisphere polycrystalline diamond elements 701 are deployed in stator 702 to radially and axially support and provide sliding engagement with rotor 703. FIG. 7B also shows optional through bore 707 such as could be used in a discrete bearing. The embodiment shown in FIGS. 7A and 7B may further act as a rotor catch.

Although FIGS. 7A and 7B depict a rotor and stator such as would be used in a downhole pump or motor, other assemblies, including a discrete radial bearing assembly, may be designed and manufactured in the same or similar way. Non-limiting proximal and distal dimensions for such a discrete bearing are indicated by dashed lines 705. Further, although FIGS. 7A and 7B depict four polycrystalline diamond elements 701, it would be understood by those skilled in the art that fewer (e.g., three) or more polycrystalline diamond elements may be deployed in stator 702. Additionally, although FIGS. 7A and 7B depict a single circumferential set of polycrystalline diamond elements, it would be understood by those skilled in the art that one or more additional circumferential sets of polycrystalline diamond elements may be deployed in the stator to increase lateral and axial support and lateral and axial load taking capability of the bearing assembly.

Stator with Planar Polycrystalline Diamond Element

Figure 8A:
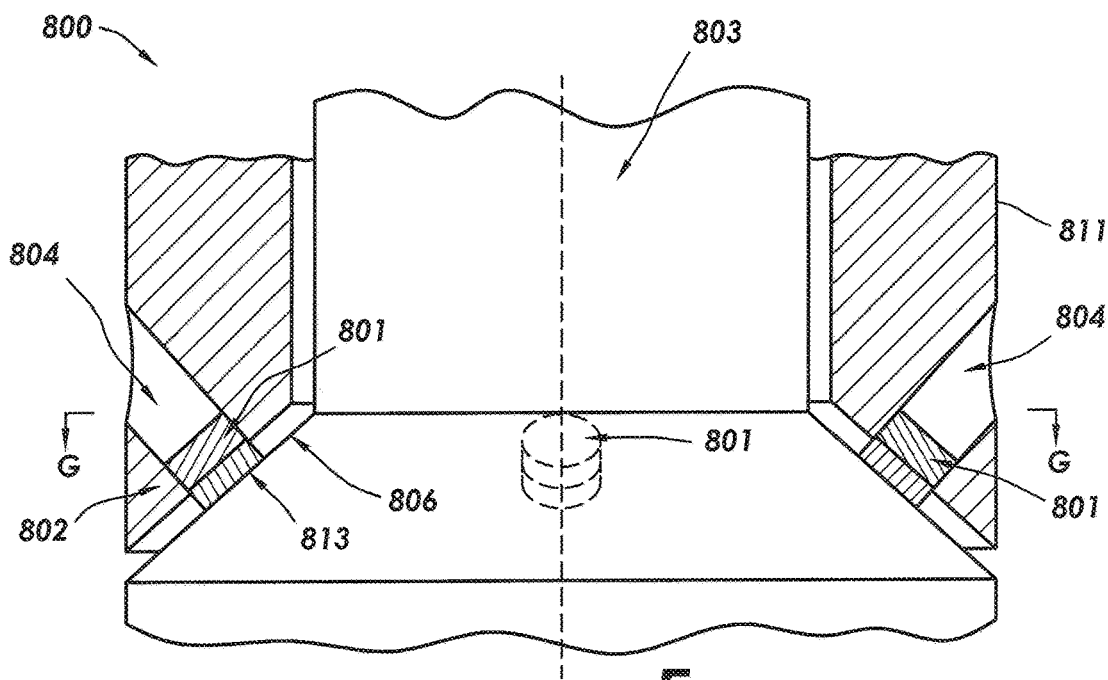
FIG. 8A is a partial side view of a rotor and stator radial bearing assembly of an embodiment of the technology of this application.
Figure 8B:
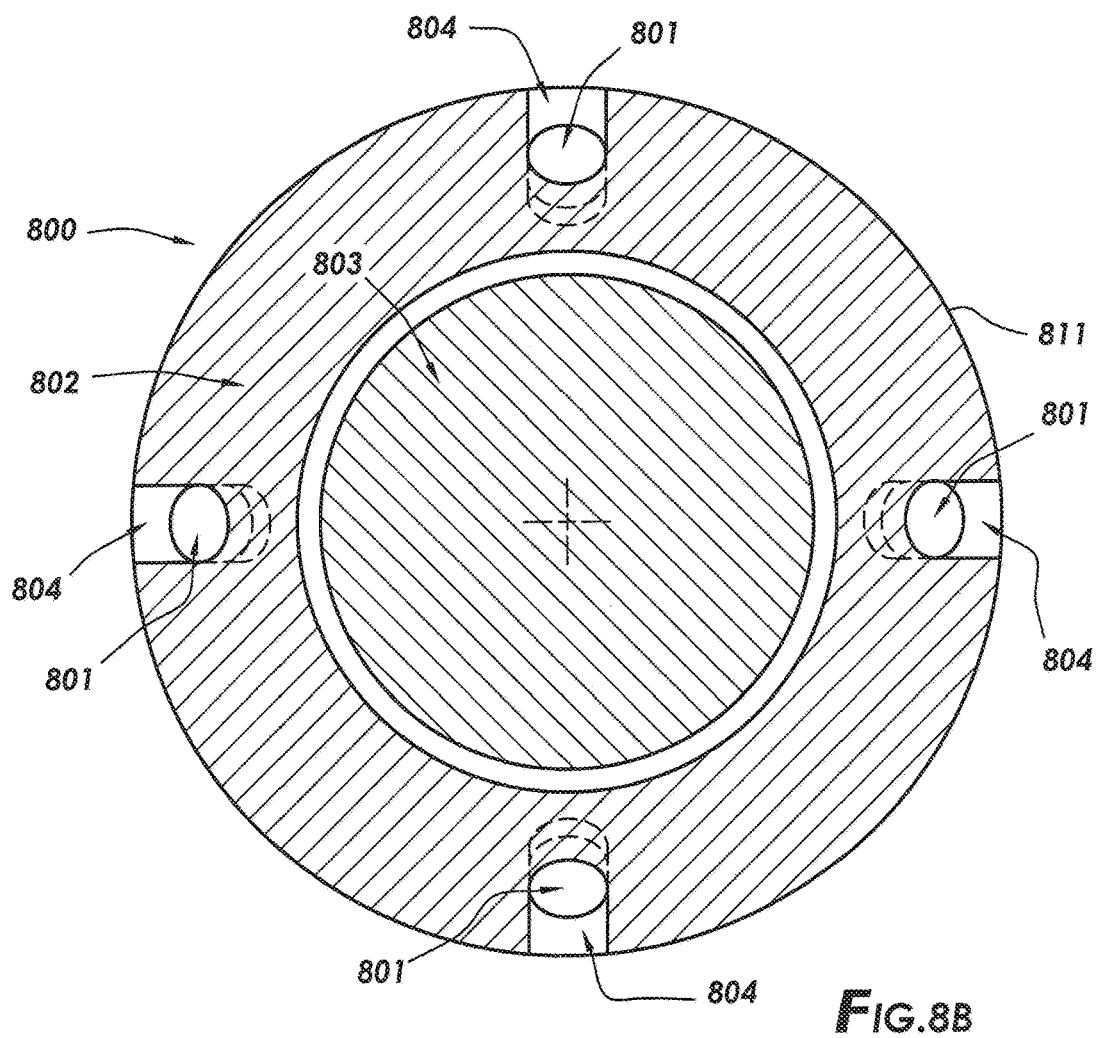
FIG. 8B is a cross-sectional view of the assembly of FIG. 8A taken along line G-G.

FIGS. 8A and 8B depict rotor and stator radial bearing assembly 800 including planar polycrystalline diamond elements 801 fitted into stator body 811 of stator 802 to provide for sliding engagement with rotor 803, which is formed of or includes at least some diamond reactive material. Polycrystalline diamond elements 801 are deployed in stator 802 through loading ports 804 formed in and/or positioned in stator body 811. Polycrystalline diamond elements 801 may be press fit, glued, brazed, threaded, or otherwise mounted using methods known to those skilled in the art.

Polycrystalline diamond elements 801 are placed into a secure contacting position relative to radial/thrust conical surface 806 of rotor 803 to limit lateral and upward axial movement of rotor 803 while allowing for free sliding rotation of rotor 803 during operation.

The planar polycrystalline diamond elements 801 slidingly engage the mating radial/thrust conical surface of rotor 803, such that engagement surfaces 813 contact and interface with opposing engagement surface 806. As is evident from FIG. 8B, polycrystalline diamond elements 801 are deployed in stator 802 to radially and axially support and provide sliding engagement with rotor 803.

Although FIGS. 8A and 8B depict four polycrystalline diamond elements 801, it would be understood by those skilled in the art that fewer (e.g., three) or more polycrystalline diamond elements may be deployed in stator 802. Further, although FIGS. 8A and 8B depict a single circumferential set of polycrystalline diamond elements 801, it would be understood that one or more additional circumferential sets of polycrystalline diamond elements may be deployed in the stator to increase lateral and axial support and lateral and axial load taking capability of the bearing assembly.

Stator with Convex Polycrystalline Diamond Element

Figure 9A:
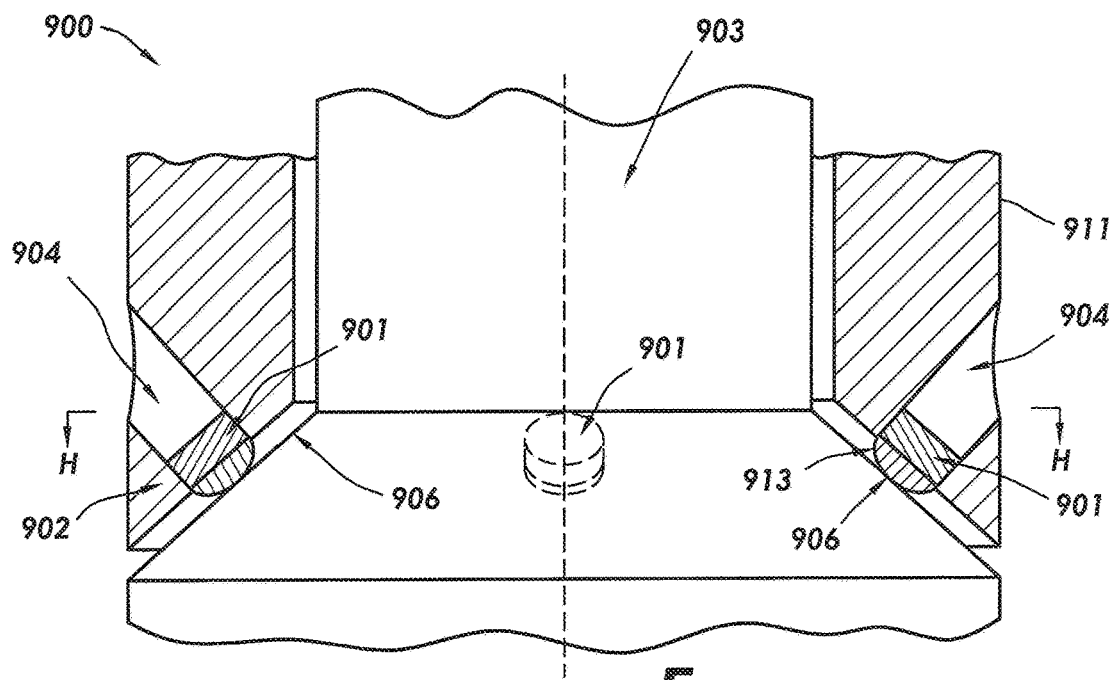
FIG. 9A is a partial side view of a rotor and stator radial bearing assembly of an embodiment of the technology of this application.
Figure 9B:
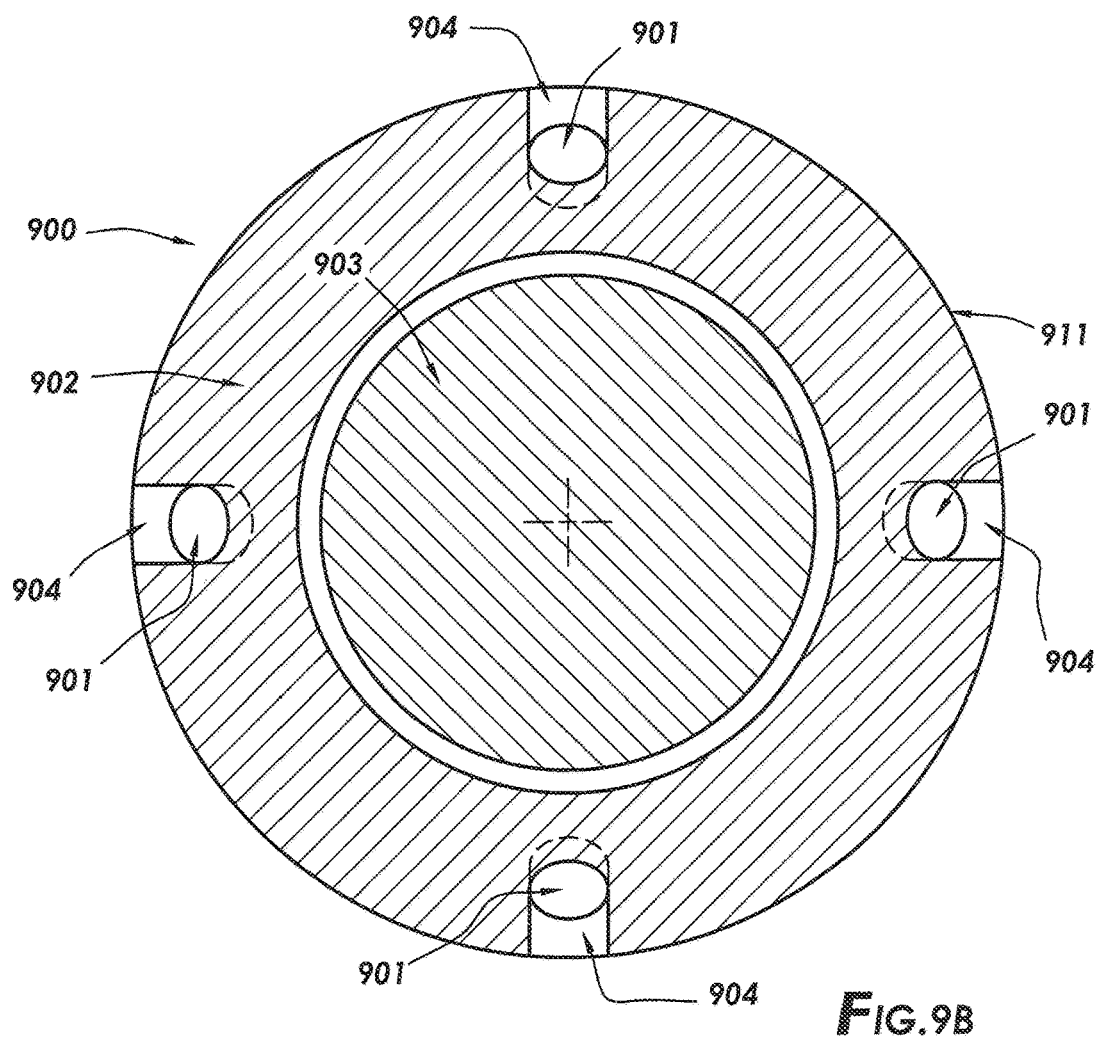
FIG. 9B is a cross-sectional view of the assembly of FIG. 9A taken along line H-H.

FIGS. 9A and 9B depict rotor and stator radial bearing assembly 900, which is substantially similar to that of FIGS. 8A and 8B, with the exception that polycrystalline diamond elements 901 have convex engagement surfaces 913 rather than planar engagement surfaces.

Convex polycrystalline diamond elements 901 are fitted into stator body 911 of stator 902 to provide for sliding engagement with rotor 903. Polycrystalline diamond elements 901 are deployed in stator 902 through loading ports 904 formed in and/or positioned in stator body 911. Polycrystalline diamond elements 901 may be press fit, glued, brazed, threaded, or otherwise mounted using methods known to those skilled in the art.

Convex polycrystalline diamond elements 901 are placed into secure contacting position with radial/thrust conical surface 906 of rotor 903 to limit lateral and upward axial movement of rotor 903 while allowing for free sliding rotation of rotor 903 during operation. Polycrystalline diamond elements 901 slidingly engage the mating radial/thrust conical surface of rotor 903, such that engagement surfaces 913 contact and interface with opposing engagement surface 906.

As is evident from FIG. 9B, convex polycrystalline diamond elements 901 are deployed in stator 902 to radially and axially support and provide sliding engagement with rotor 903.

Although FIGS. 9A and 9B depict four polycrystalline diamond elements 901, it would be understood by those skilled in the art that fewer (e.g., three) or more polycrystalline diamond elements may be deployed in stator 902. Further, although FIGS. 9A and 9B depict a single circumferential set of polycrystalline diamond elements 901, it would be understood by those skilled in the art that one or more additional circumferential sets of polycrystalline diamond elements may be deployed in the stator to increase lateral and axial support and lateral and axial load taking capability of the bearing assembly.

Rotor with Convex Polycrystalline Diamond Element

Figure 10A:
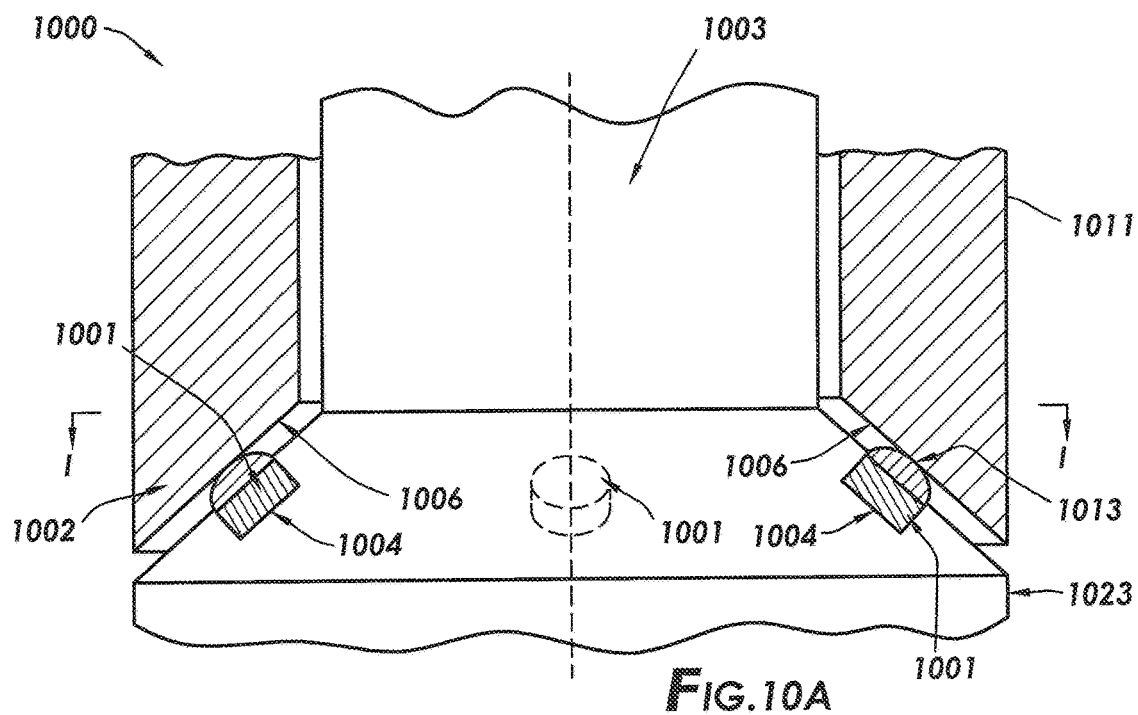
FIG. 10A is a partial side view of a rotor and stator radial bearing assembly of an embodiment of the technology of this application.
Figure 10B:
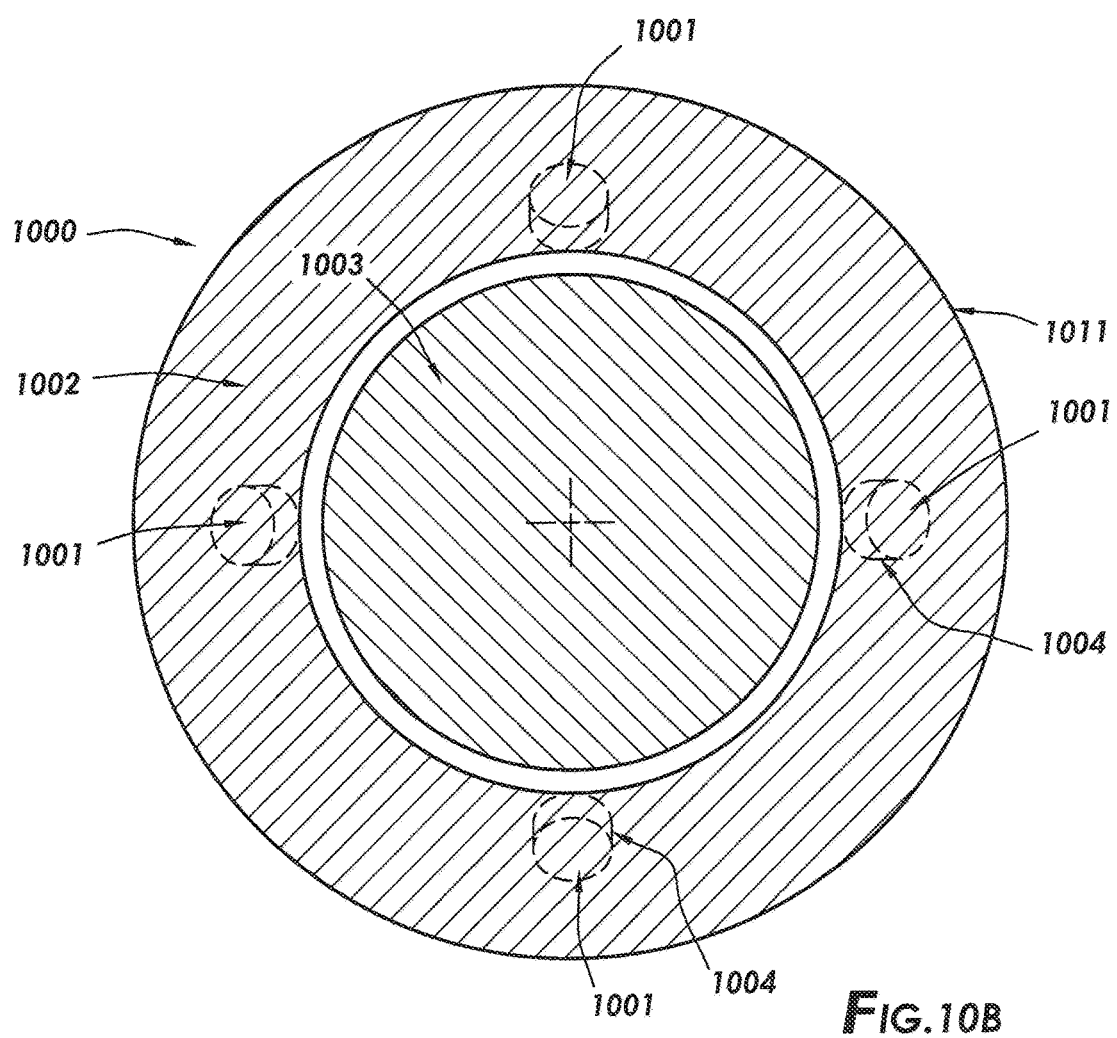
FIG. 10B is a top cross-sectional view of the assembly of FIG. 10A taken along line I-I.

FIGS. 10A and 10B depict a rotor and stator radial and thrust bearing assembly 1000 including convex polycrystalline diamond elements 1001 fitted into rotor body 1023 of rotor 1003 to provide for sliding engagement with stator 1002, which is formed of or includes at least some diamond reactive material. Polycrystalline diamond elements 1001 are deployed in rotor 1003 in sockets 1004 formed in and/or positioned in rotor body 1023. Polycrystalline diamond elements 1001 may be press fit, glued, brazed, threaded, or otherwise mounted using methods known to those skilled in the art.

Convex polycrystalline diamond elements 1001 are placed into a secure contacting position within radial/thrust conical surface 1006 of stator 1002 to limit lateral and upward axial movement of rotor 1003 while allowing for free sliding rotation of rotor 1003 during operation. The convex polycrystalline diamond elements 1001 slidingly engage the mating radial/thrust conical surface of stator 1002, such that engagement surfaces 1013 contact and interface with opposing engagement surface 1006. As is evident from FIG. 10B, convex polycrystalline diamond elements 1001 are deployed in rotor 1003 to radially and axially support and provide sliding engagement with subject material stator 1002.

Although FIGS. 10A and 10B depict four polycrystalline diamond elements 1001, it would be understood by those skilled in the art that fewer (e.g., three) or more polycrystalline diamond elements may be deployed in rotor 1003. Further, although FIGS. 10A and 10B depict a single circumferential set of polycrystalline diamond elements 1001, it would be understood by those skilled in the art that one or more additional circumferential sets of polycrystalline diamond elements may be deployed in the rotor to increase lateral and axial support and lateral and axial load taking capability of the bearing assembly.

Stator with Planar Polycrystalline Diamond Element

Figure 11A:
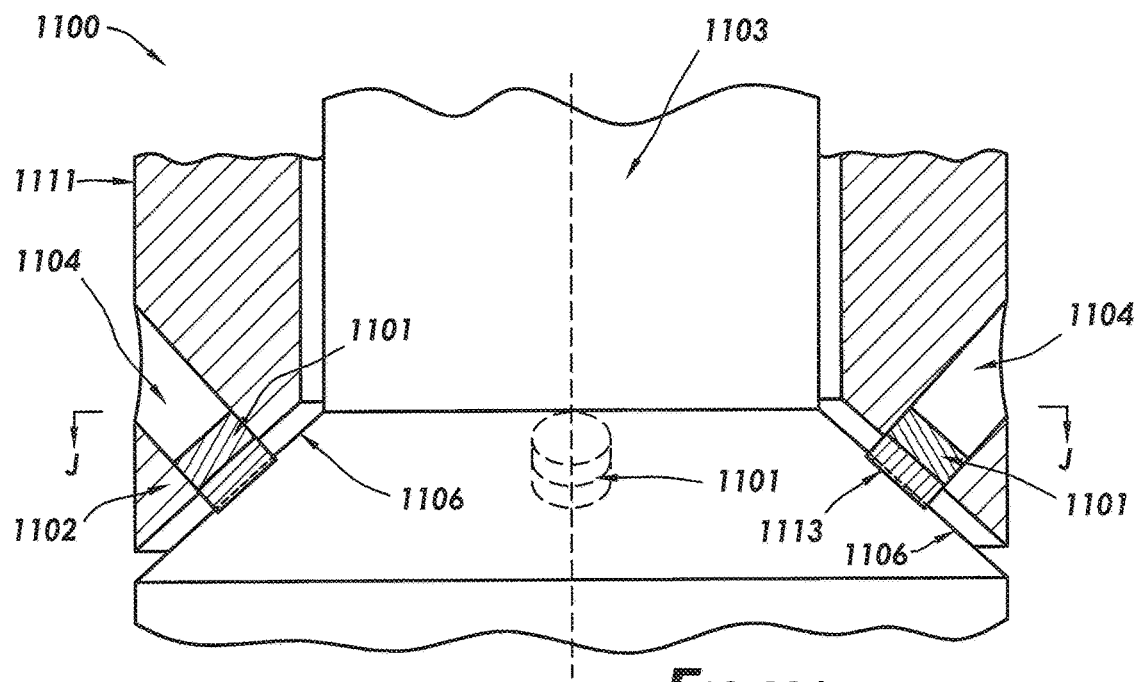
FIG. 11A is a partial side view of a rotor and stator radial bearing assembly of an embodiment of the technology of this application.
Figure 11B:
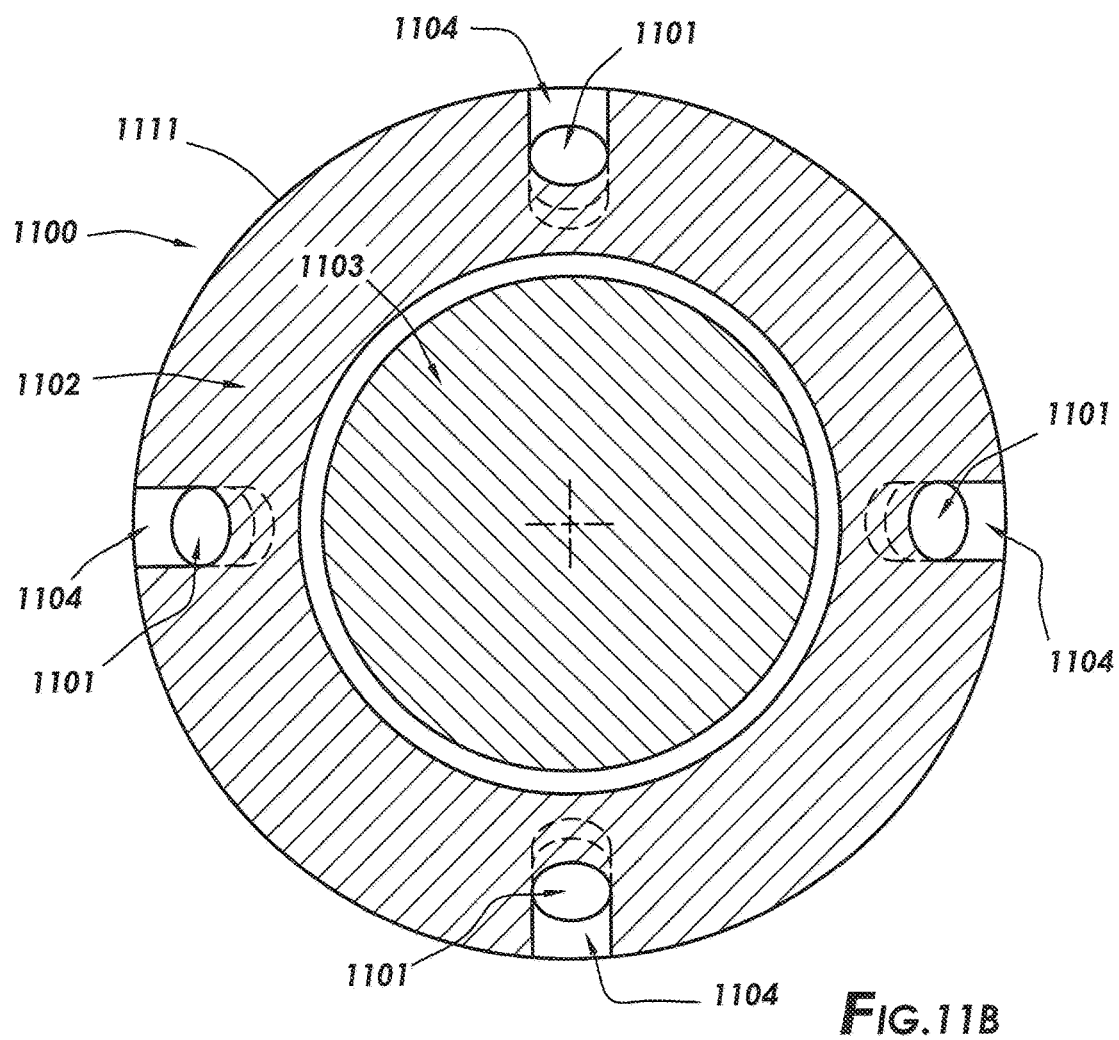
FIG. 11B is a cross-sectional view of the assembly of FIG. 11A taken along line J-J.

FIGS. 11A and 11B depict rotor and stator radial and thrust bearing assembly 1100 including concave, or at least slightly concave, polycrystalline diamond elements 1101 fitted into stator body 1111 of stator 1102 to provide for sliding engagement with rotor 1103, which is formed of or includes at least some diamond reactive material. Polycrystalline diamond elements 1101 are deployed in stator 1102 through loading ports 1104 formed and/or positioned therethrough. Polycrystalline diamond elements 1101 may be press fit, glued, brazed, threaded, or otherwise mounted using methods known to those skilled in the art.

Polycrystalline diamond elements 1101 are placed into a secure contacting position within radial/thrust conical surface 1106 of rotor 1103 to limit lateral and upward axial movement of rotor 1103 while allowing for free sliding rotation of rotor 1103 during operation. Polycrystalline diamond elements 1101 are oriented with the axis of the concavity in line with the circumferential rotation of the rotor 1103 to ensure no edge or point contact, and thus ensure only linear area contact generally with the deepest portion of the concavity. The slightly concave polycrystalline diamond elements 1101 slidingly engage the radial/thrust conical surface of rotor 1103, such that engagement surfaces 1113 contact and interface with opposing engagement surface 1106.

As is evident from FIG. 11B, slightly concave polycrystalline diamond elements 1101 are deployed in stator 1102 to radially and axially support and provide sliding engagement with rotor 1103.

Although FIGS. 11A and 11B depict four polycrystalline diamond elements 1101, it would be understood by those skilled in the art that fewer (e.g., three) or more polycrystalline diamond elements may be deployed in stator 1102. Further, although FIGS. 11A and 11B show a single circumferential set of polycrystalline diamond elements 1101, it would be understood by those skilled in the art that one or more additional circumferential sets of polycrystalline diamond elements may be deployed in the stator to increase lateral and axial support and lateral and axial load taking capability of the bearing assembly.

Rotor with Convex Polycrystalline Diamond Elements

Figure 12A:
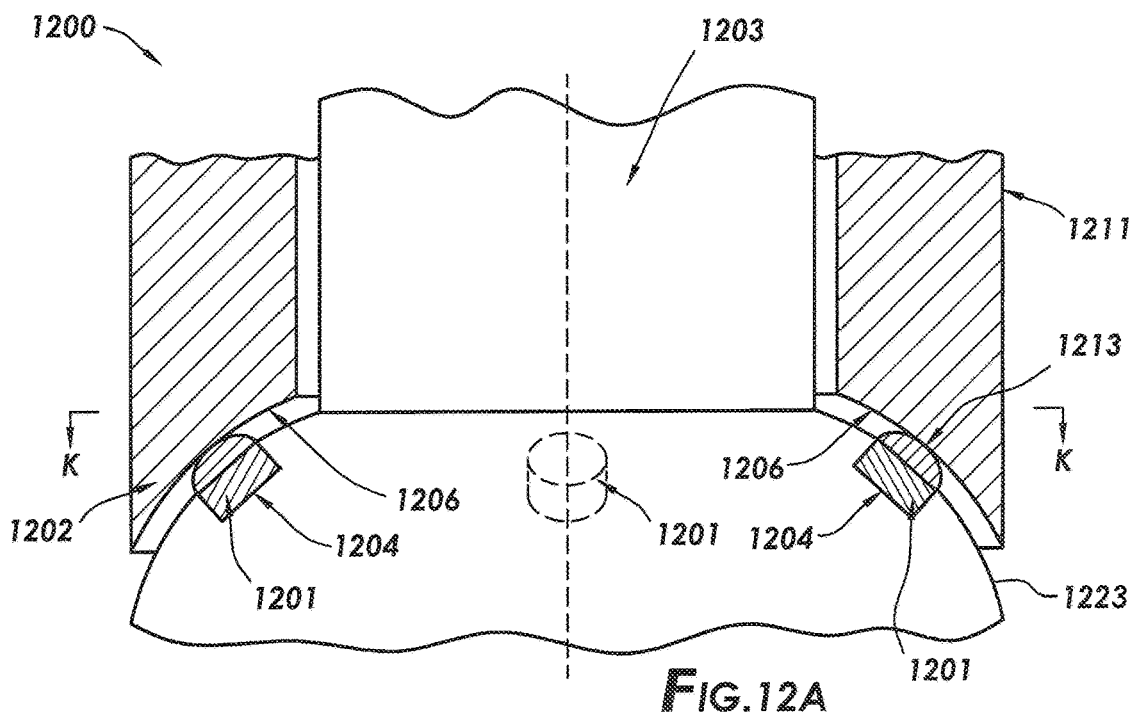
FIG. 12A is a partial side view of a rotor and stator radial bearing assembly of an embodiment of the technology of this application.
Figure 12B:
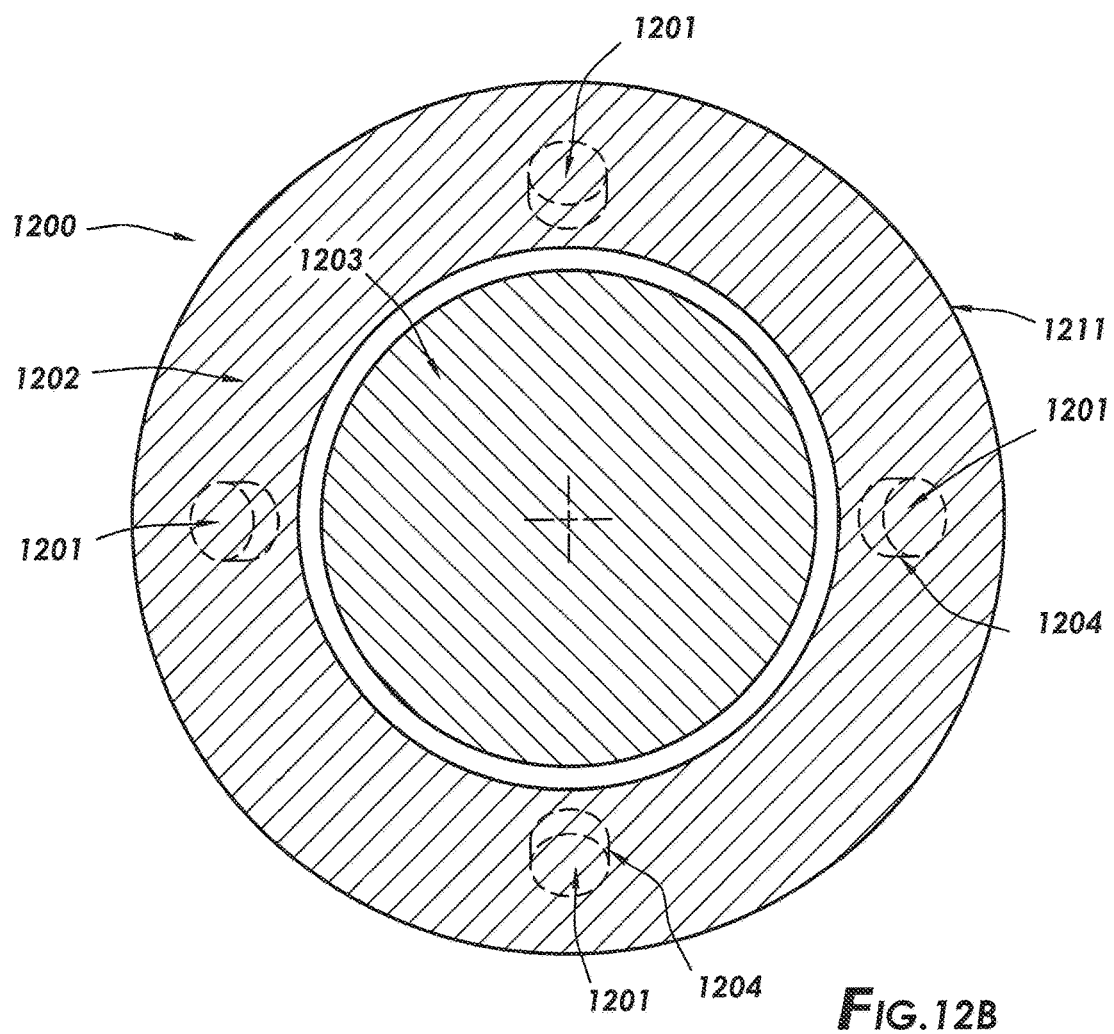
FIG. 12B is a cross-sectional view of the assembly of FIG. 12A taken along line K-K.

FIGS. 12A and 12B depict rotor and stator radial and thrust bearing assembly 1200, including convex polycrystalline diamond elements 1201 are fitted into rotor body 1223 of rotor 1203 to provide for sliding engagement with stator 1202. Polycrystalline diamond elements 1201 are deployed in rotor 1203 in sockets 1204 formed in and/or positioned in rotor body 1223. Polycrystalline diamond elements 1201 may be press fit, glued, brazed, threaded, or otherwise mounted using methods known to those skilled in the art.

Convex polycrystalline diamond elements 1201 are placed into a secure contacting position within radial/thrust concave curved surface 1206 of stator 1202 to limit lateral and upward axial movement of rotor 1203 while allowing for free sliding rotation of rotor 1203 during operation. Convex polycrystalline diamond elements 1201 slidingly engage the mating radial/thrust concave curved surface of stator 1202, such that engagement surfaces 1213 engage with radial/thrust concave curved surface 1206. In the embodiment of FIGS. 12A and 121B, the radial/thrust concave curved surface 1206 is or forms the opposing engagement surface. In the assembly 1200, the contact areas on the convex polycrystalline diamond elements 1201 are generally circular. However, one skilled in the art would understand that the polycrystalline diamond elements are not limited to having such a contact area.

As is evident from FIG. 12B, convex polycrystalline diamond elements 1201 are deployed in rotor 1203 to radially and axially support and provide sliding engagement with stator 1202.

Although FIGS. 12A and 12B depict four polycrystalline diamond elements 1201, it would be understood by those skilled in the art that fewer (e.g., three) or more polycrystalline diamond elements may be deployed in rotor 1203. Further, although FIGS. 12A and 12B depict a single circumferential set of polycrystalline diamond elements 1201, it would be understood by those skilled in the art that one or more additional circumferential sets of polycrystalline diamond elements may be deployed in the rotor to increase lateral and axial support and lateral and axial load taking capability of the bearing assembly.

Stator with Planar Polycrystalline Diamond Elements

Figure 13A:
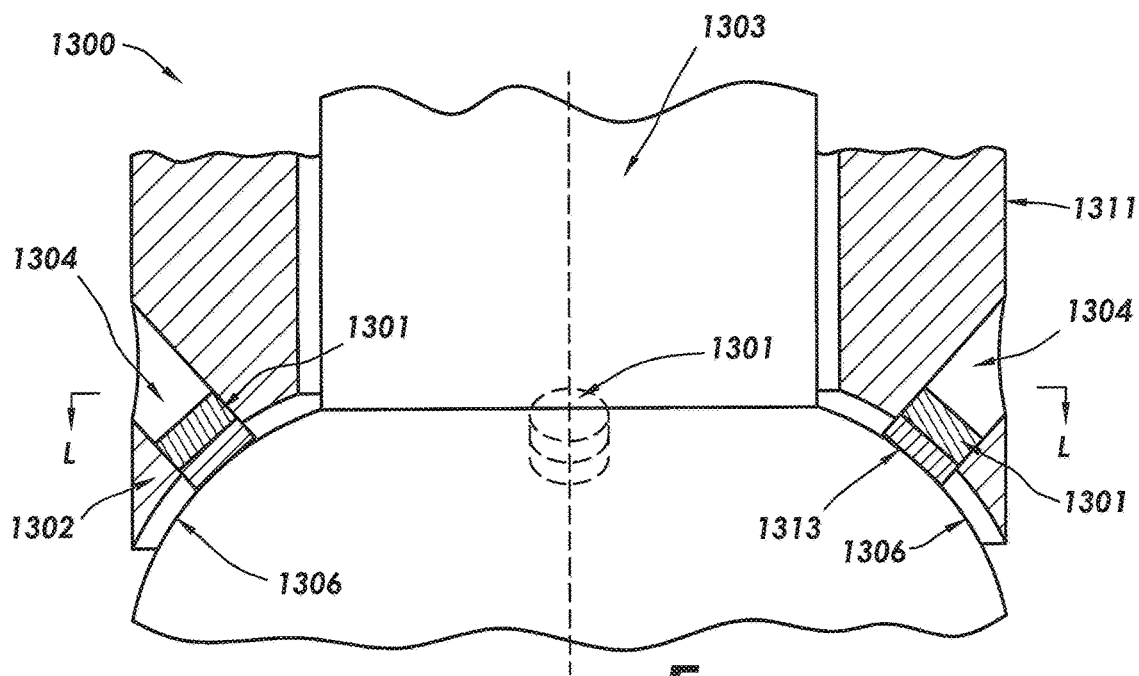
FIG. 13A is a partial side view of a rotor and stator radial bearing assembly of an embodiment of the technology of this application.
Figure 13B:
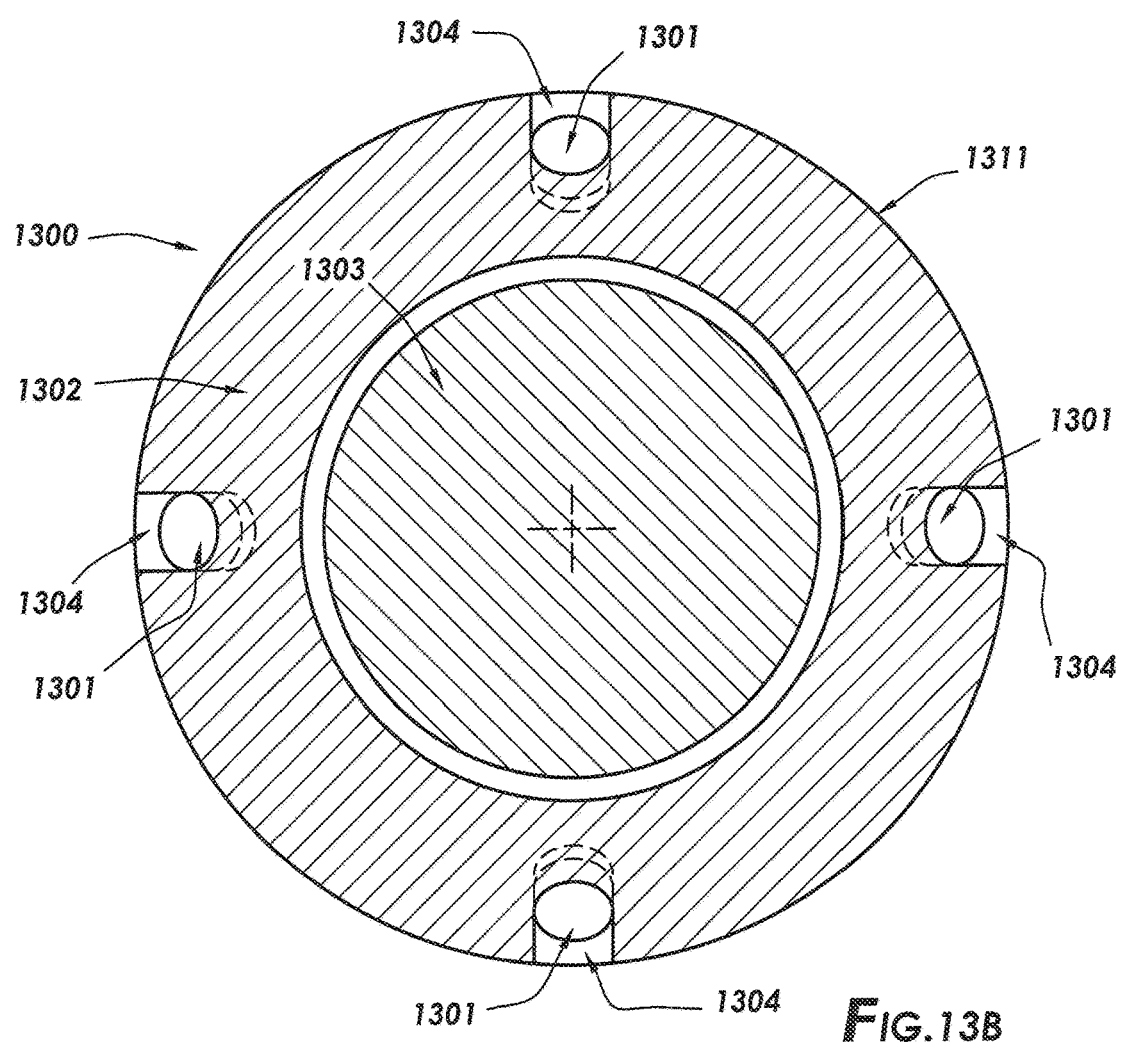
FIG. 13B is a cross-sectional view of the assembly of FIG. 13A taken along line L-L.

FIGS. 13A and 13B depict a partial side view of a rotor and stator radial and thrust bearing assembly 1300 including planar (or domed, not shown) polycrystalline diamond elements 1301 fitted into stator body 1311 of stator 1302 to provide for sliding engagement with rotor 1303, which is formed of or includes at least some diamond reactive material. Polycrystalline diamond elements 1301 are deployed in stator 1302 through loading ports 1304 formed in and/or positioned in stator body 1311. Polycrystalline diamond elements 1301 may be press fit, glued, brazed, threaded, or otherwise mounted using methods known to those skilled in the art.

Polycrystalline diamond elements 1301 are placed into a secure contacting position with radial/thrust convex curved surface 1306 of rotor 1303 to limit lateral and upward axial movement of rotor 1303 while allowing for free sliding rotation of rotor 1303 during operation. Radial/thrust convex curved surface 1306 is or forms the opposing engagement surface. Polycrystalline diamond elements 1301 slidingly engage the radial/thrust convex curved surface 1306 of rotor 1403, such that engagement surface 1313 is engaged with the opposing engagement surface (i.e., radial/thrust convex curved surface 1306). In the assembly 1300, the contact areas on the planar or domed polycrystalline diamond elements are typically circular. However, one skilled in the art would understand that the polycrystalline diamond elements may have different contact areas.

As is evident from FIG. 13B, planar polycrystalline diamond elements 1301 are deployed in stator 1302 to radially and axially support and provide sliding engagement with rotor 1303.

Although FIGS. 13A and 13B show four polycrystalline diamond elements 1301, it would be understood by those skilled in the art that fewer (e.g., three) or more polycrystalline diamond elements may be deployed in stator 1302. Further, although FIGS. 13A and 13B depict a single circumferential set of polycrystalline diamond elements 1301, it would be understood by those skilled in the art that one or more additional circumferential sets of polycrystalline diamond elements may be deployed in the stator to increase lateral and axial support and lateral and axial load taking capability of the bearing assembly.

As is evident in view of FIGS. 2A-13B, some aspects of the present disclosure include high-performance radial bearings incorporating polycrystalline diamond elements in sliding engagement with curved or cylindrical surfaces formed of or including at least some diamond reactive material. Some such aspects include high-performance radial bearings where a diamond reactive material containing rotor is put into sliding contact with preferably three or more polycrystalline diamond elements mounted on a stator. The polycrystalline diamond elements of the stator are preferably planar faced, but may also be slightly concave, convex, or any combination of the three. The facial contours of the polycrystalline diamond elements of the stator need not, and preferably do not, match the curve of the circumference of the stator. Although three or more polycrystalline diamond elements are preferred, the technology of the application may be practiced with as few as one or two polycrystalline diamond elements, such as where the polycrystalline diamond elements are used to reduce wear and friction on the gravitational low side of a stator in a horizontally oriented positive displacement pump or opposite the scribe side of a directional drilling assembly.

In certain applications, the bearing assemblies disclosed herein are configured to resist thrust load. At least some embodiments of the bearing assemblies disclosed herein are capable of simultaneously handling components of both radial and thrust loads.

At least some embodiments of the bearing assemblies disclosed are economically viable and of a relatively large diameter.

Edge Radius Treatment

In some aspects, the polycrystalline diamond elements are subjected to edge radius treatment. Edge radius treatment of polycrystalline diamond elements are well known in the art. In some embodiments of the technology of this application that employ planar or concave polycrystalline diamond elements, it is preferred to employ edge radius treatment of such polycrystalline diamond elements. One purpose of employing an edge radius treatment is to reduce or avoid potential for outer edge cutting or scribing at the outer limits of the linear engagement area of a given polycrystalline diamond elements with the opposing engagement surface (e.g., a curved surface.

Polycrystalline Diamond Element

In certain applications, the polycrystalline diamond elements disclosed herein have increased cobalt content transitions layers between the outer polycrystalline diamond surface and a supporting tungsten carbide slug, as is known in the art.

The polycrystalline diamond elements may be supported by tungsten carbide, or may be unsupported, "standalone" polycrystalline diamond elements that are mounted directly to the bearing component.

The polycrystalline diamond elements may by non-leached, leached, leached and backfilled, thermally stable, coated via chemical vapor deposition (CVD), or processed in various ways as known in the art.

Polycrystalline Diamond Element—Shapes, Sizes, and Arrangements

The polycrystalline diamond elements may have diameters as small as 3 mm (about ⅛") or as large as 75 mm (about 3"), depending on the application and the configuration and diameter of the bearing. Typically, the polycrystalline diamond elements have diameters between 8 mm (about 5/16") and 25 mm (about 1").

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art. In some applications, the radial bearings have one or more convex, contoured polycrystalline diamond elements mounted on a rotor (or stator) in sliding contact with a stator (or rotor).

In some applications, the polycrystalline diamond elements are deployed in rings along the bearing component. A non-limiting example is a ring of five planar face polycrystalline diamond elements deployed on a distal portion of a stator and another ring of five planar face polycrystalline diamond elements deployed on a proximal portion of the stator. Thus, the high-performance polycrystalline diamond elements bearing assemblies can be deployed to ensure stable operation along the length of the stator/rotor interface, while requiring less total polycrystalline diamond elements than are used in prior, existing assemblies.

The polycrystalline diamond elements may be arranged in any pattern, layout, spacing or staggering within the bearing assembly to provide the desired support, without concern for the need for overlapping contact with polycrystalline diamond elements engagement surfaces on the opposing bearing component.

Polycrystalline Diamond Element—Contact Area of Engagement Surface

The polycrystalline diamond elements disclosed herein are, in some embodiments, not shaped to conform precisely to the opposing engagement surface. In certain embodiments, the sliding interface contact area of the engagement surface of the polycrystalline diamond element is less than 80%, or less than 75%, or less than 70%, or less than 60% of the total surface area of the polycrystalline diamond element. As used herein, the "contact area" of the engagement surface refers to the surface area of the engagement surface that is in contact with the opposing engagement surface.

A key performance criterion is that the polycrystalline diamond element is configured and positioned in such a way as to preclude any edge or point contact with the opposing engagement surface or component. For a planar faced polycrystalline diamond element placed on the stator, such polycrystalline diamond elements typically experience less than full face contact with the rotor. That is, as the rotor rotates against the polycrystalline diamond elements, the engagement surface contact area is less than full face. For polycrystalline diamond elements, mounted on either the rotor or stator, that are at least slightly domed or convex, such polycrystalline diamond elements exhibit a small, generally circular engagement surface contact area. If the convex polycrystalline diamond elements, mounted on either the rotor or stator, are saddle shaped, then the polycrystalline diamond elements exhibit a small linear area engagement surface contact area. For slightly concave polycrystalline diamond elements that are deployed on the stator, a somewhat narrow linear engagement surface contact area is exhibited on each polycrystalline diamond element.

Polycrystalline Diamond Element—Mounting

As previously described, the polycrystalline diamond elements may be mounted directly to the bearing element (e.g., stator or rotor) via methods known in the art including, but not limited to, brazing, gluing, press fitting, shrink fitting, or threading. Additionally, the polycrystalline diamond elements may be mounted in a separate ring or rings. The ring or rings may then be deployed on the bearing element (rotor or stator) via methods known in the art including, but not limited to, gluing, press fitting, thread locking, or brazing.

Planar face or domed polycrystalline diamond elements may be mounted in a manner to allow them to rotate about their own axis. Reference is made to U.S. Pat. No. 8,881,849, to Shen et. al., as a non-limiting example of a method to allow the polycrystalline diamond element to spin about its own axis while in facial contact with subject material.

Treatment of Opposing Engagement Surface

In some aspects, the opposing engaging surface of the diamond reactive material is pre-saturated with carbon (e.g., prior to engagement with the engagement surface). Such pre-saturation reduces the ability of the diamond reactive material to attract carbon through graphitization of the surface of the polycrystalline diamond. The pre-saturation of the diamond reactive material surface contact area may be accomplished via any method known in the art.

Solid Lubricant Source

In certain applications, a solid lubricant source, for example, a graphite or hexagonal boron nitride stick or inclusion, either energized or not energized, is in contact with the opposing engagement surface formed of or including at least some the diamond reactive material.

Applications

The bearing assemblies disclosed herein may form a portion of a machine or other apparatus or system. In some such aspects, the proximal end of the stator may be connected to another component, such as a drill string or motor housing by threaded connection, welding, or other connection means as known in the art. In some aspects, if the bearing assembly is used in a downhole application, the distal end of the rotor may be augmented by a thrust bearing and may carry a threaded connection for the attachment of a drill bit, or the distal end of the rotor may be a drill bit directly formed on and/or positioned on the end of the mandrel of the rotor. The component connections are not limited to downhole applications, and can be applied to other applications, for example wind turbine energy generators, or marine applications.

Furthermore, discrete versions of the bearing assemblies described herein may be used in a broad array of other applications including, but not limited to, heavy equipment, automotive, turbines, transmissions, rail cars, computer hard drives, centrifuges, medical equipment, pumps, and motors.

In certain aspects, the bearing assemblies disclosed herein are suitable for deployment and use in harsh environments (e.g., downhole). In some such aspects, the bearing assemblies are less susceptible to fracture than bearing assemblies where a polycrystalline diamond engagement surface engages with another polycrystalline diamond engagement surface. In certain aspects, such harsh environment suitable radial bearings provide enhanced service value in comparison with bearing assemblies that include a polycrystalline diamond engagement surface engaged with another polycrystalline diamond engagement surface. Furthermore, the bearing assemblies disclosed herein may be capable of being spaced apart at greater distances that the spacings required when using bearing assemblies that include a polycrystalline diamond engagement surface engaged with another polycrystalline diamond engagement surface.

In certain applications, the bearing assemblies disclosed herein can act as a rotor catch, such as in downhole applications.

In lubricated environments, the bearing assemblies may benefit from the hydrodynamic effect of the lubricant creating a clearance between the moving and stationary elements of the bearing assembly.

Exemplary Testing

In an effort to develop a robust cam follower interface for use in Applicants' previously referenced "Drilling Machine" of U.S. patent application Ser. No. 15/430,254 (the '254 application), Applicants designed and constructed an advanced test bench. The test bench employed a 200 RPM electric gearmotor driving a hard-faced ferrous rotor mandrel inside a hard-faced ferrous stator housing. The mandrel incorporated a non-hard faced offset camming cylinder midway along its length. The rotor/stator assembly was fed a circulating fluid through the use of a positive displacement pump. Candidate cam follower interface mechanisms were placed in sealed contact and under load with the camming cylinder of the rotor mandrel. Employing the test bench, candidate interface mechanisms were tested for survivability and wear under loads ranging from 500 to 3000 lbf either in clear water or in sand laden drilling fluid.

The Applicants conducted testing of the ferrous camming cylinder in sliding contact with polished polycrystalline diamond surfaces without deleterious effects or apparent chemical interaction. Ferrous materials are attractive for bearing applications due to their ready availability, ease of forming and machining, higher elasticity, and lower cost than so called superhard materials.

The testing program conducted by the Applicants has established that, even at relatively high loads and high RPM speeds, a successful load interface between polycrystalline diamond and diamond reactive materials can be employed in bearing applications.

A key finding has been that, as long as polycrystalline diamond elements are not put into edge or point contact with diamond reactive materials, which, it is believed, could lead to machining and chemical interaction, the polycrystalline diamond can experience sliding contact with diamond reactive materials at the typical bearing loads and speeds called for in many applications. This unexpected and surprising success of the Applicants' testing has led to the development of new high performance radial bearings.

The testing program included tests of a curved ferrous surface in high load facial linear area contact with planar polycrystalline diamond under rotation. This testing produced a slightly discolored Hertzian contact area on the face of the PDC about 0.250" in width along the entire ½" wide face of the polycrystalline diamond. The width of the contact area can be explained by the cam offset, vibration in the system and by slight deformation of the ferrous metal under load. It is estimated that the total contact area on the ½" polycrystalline diamond element face, at any given point in time, is about 7%, or less, of the total area of the polycrystalline diamond element face. The configuration employed in the testing demonstrates that even a small surface area on the face of a polycrystalline diamond element can take significant load.

Additional testing of a spherical ferrous ball under load and rotation against a planar polycrystalline diamond face produced a small, approximately 0.030 diameter, discolored Hertzian contact area in the center of the polycrystalline diamond element. As in the contact explanation above, it is believed, without being bound by theory, that the diameter of the discoloration is a result of slight vibration in the test apparatus and by slight deformation of the ferrous metal under load.

Table 2, below, sets forth data summarizing the testing performed by the Applicants of various configurations of sliding interface. In Table 2, the loadings for Tests 1 through 10 are: 1200 lb (about 544 kg), 500 lb (about 227 kg), 700 lb (about 318 kg), 700 lb (about 318 kg), 900 lb (about 408 kg), 900 lb (about 408 kg), 2000 lb (about 907 kg), 2000 lb (about 907 kg), 3000 lb (about 1361 kg), and 1100 lb (about 499 kg), respectively. In the result column of Test 9, 3000 lbf is equivalent to about 13,345 newtons.

| | | RPM | Surface Speed | Leading | Result |
|---|---|---|---|---|---|
| | Tested Mechanism - Bearing Steel Ball in Alloy Steel Cup Against Rotating Steel Cam Surface | | | | |
| Test 1 | 1.50 Ball Socket | 200 | 1.13 m/s | 1200 lb | Abort after 3 minutes, ball is not rolling, heavy galling on ball and cup |
| Test 2 | 1.25 Ball Socket | 200 | 1.13 m/s | 500 lb | Abort after 3 minutes, ball is not rolling, heavy galling on ball and cup |
| Test 3 | Single Polished PDC 1.50 Ball | 200 | 1.13 m/s | 700 lb | Ball is rolling, wear of steel on side wall of cup after 45 minutes |
| Test 4 | Tripod Polished PDC 1.50 Ball | 200 | 1.13 m/s | 700 lb | 20 hr. test, little wear on Ball slight Hertzian trace on PDCs |
| | Tested Mechanism - Planar PDC Rotating Steel Cam Surface | | | | |
| Test 5 | Single Polished PDC Slider | 200 | 1.13 m/s | 900 lb | Ran 20 hours, PDC direct on steel cam in water. Slight, small Hertzian trace on PDC |
| Test 6 | Single Polished PDC Slider | 200 | 1.13 m/s | 900 lb | Varied load from zero, 4 hrs, good results in water. Slight, small Hertzian trace on PDC |
| Test 7 | Single Polished PDC Slider | 200 | 1.13 m/s | 2000 lb | Varied load from zero, 20 hrs, good results in water. Slight, small Hertzian trace on PDC |
| Test 8 | Single Polished PDC Slider | 200 | 1.13 m/s | 2000 lb | Drilling Fluid & Sand test, 32+ hrs, good results. Slight, small Hertzian trace on PDC |
| Test 9 | Single Polished PDC Slider | 200 | 1.13 m/s | 3000 lb | Mud test at 3000 lbf, 10 hrs, good results. Slight, small Hertzian trace on PDC |
| Test 10 | Single Polished vs Single Unpolished | 200 | 1.13 m/s | 1100 lb | Mud test, 2 hours each, Unpolished coefficient of friction at least 50% higher by ampere measurement |

Tests 1 and 2 summarize failed tests of individual steel balls rolling in a steel cup under load. Test 3 summarizes the results of a more successful test of a steel ball supported by a single polished PDC element in a steel cup. Test 4 summarizes a very successful test of a single steel ball supported by an array of three polished polycrystalline diamond elements in a steel cup. Tests 5 through 9 summarize increasingly rigorous tests each of a single polished polycrystalline diamond element in sliding contact with a rotating ferrous cam surface. Test 10 summarizes a comparative test of a single polished polycrystalline diamond element versus a single unpolished polycrystalline diamond element, each in sliding contact with a rotating ferrous cam surface. The final test shows a significant increase in coefficient of friction when the unpolished polycrystalline diamond element was used. The conditions and results presented in Table 2 are emblematic of the potential use of polycrystalline diamond on diamond reactive material and are not to be considered limiting or fully encompassing of the technology of the application.

Testing Conclusions

It was found that applications of polycrystalline diamond elements in a radial bearing can employ far less than the full face of the elements and still take significant load. This finding means effective polycrystalline diamond element containing radial bearings can be designed and manufactured without the need for full face contact of the polycrystalline diamond elements with the opposing surface. Employing this finding in the technology of the present application means it is possible to manufacture radial bearings with far less processing of the polycrystalline diamond elements used and substantially reducing the risk of edge clashing, or of the instigation of machining of a diamond reactive material opposing surface.

Without being bound by theory, in operation, running a cam and cam follower in a liquid cooled, lubricated environment, allows for higher speeds and loads to be attained without commencing a thermo-chemical reaction. Further, a polycrystalline diamond face that has been polished, notably, provides a lower thermo-chemical response.

From the descriptions and figures provided above it can readily be understood that the bearing assembly technology of the present application may be employed in a broad spectrum of applications, including those in downhole environments. The technology provided herein additionally has broad application to other industrial applications.

Furthermore, while shown and described in relation to engagement between surfaces in a radial bearing assembly, one skilled in the art would understand that the present disclosure is not limited to this particular application and that the concepts disclosed herein may be applied to the engagement between any diamond reactive material surface that is engaged with the surface of a diamond material.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A radial bearing assembly comprising:
    a polycrystalline diamond element that includes an engagement surface;
    an opposing engagement surface comprising a diamond reactive material, wherein the engagement surface of the polycrystalline diamond element is in sliding engagement with the opposing engagement surface.

2. The radial bearing assembly of claim 1, wherein the polycrystalline diamond element has a shape selected from the group including: dome, hemisphere, ovoid, cylinder, paraboloid, conical, square, and rectangular.

3. The radial bearing assembly of claim 1, wherein the engagement surface of the polycrystalline diamond element includes a planar surface, a convex surface, or a concave surface.

4. The radial bearing assembly of claim 1, wherein the engagement surface of the polycrystalline diamond element is highly lapped, polished, or highly polished.

5. The radial bearing assembly of claim 1, wherein the engagement surface of the polycrystalline diamond element has a surface finish that is equal to or less than 20 µin.

6. The radial bearing assembly of claim 1, wherein the engagement surface of the polycrystalline diamond element is not shaped to conform precisely to the opposing engagement surface.

7. The radial bearing assembly of claim 1, wherein a contact area between the engagement surface and the opposing engagement surface is less than 75% of a total surface area of the engagement surface.

8. The radial bearing assembly of claim 1, wherein the polycrystalline diamond element does not make edge or point contact with the opposing engagement surface.

9. The radial bearing assembly of claim 1, wherein the opposing engagement surface is saturated with carbon.

10. The radial bearing assembly of claim 1, wherein the opposing engagement surface is a metal surface, wherein the diamond reactive material includes diamond catalyst or diamond solvent, the diamond catalyst or diamond solvent including iron or an alloy thereof, cobalt or an alloy thereof, nickel or an alloy thereof, ruthenium or an alloy thereof, rhodium or an alloy thereof, palladium or an alloy thereof, chromium or an alloy thereof, manganese or an alloy thereof, copper or an alloy thereof; titanium or an alloy thereof; or tantalum or an alloy thereof.

11. The radial bearing assembly of claim 1, wherein the diamond reactive material is in the form of a hardfacing, coating, or plating.

12. The radial bearing assembly of claim 1, wherein, in addition to radial load, the radial bearing assembly bears axial load.

13. The radial bearing assembly of claim 1, wherein the radial bearing assembly includes a stator engaged with a rotor, and wherein the engagement surfaces and the opposing engagement surface interface sliding contact between the rotor and the stator.

14. The radial bearing assembly of claim 13, wherein the polycrystalline diamond element is positioned and arranged on the stator in sliding contact with the rotor, wherein the rotor includes the opposing engagement surface.

15. The radial bearing assembly of claim 14, wherein the polycrystalline diamond element is positioned within a loading port in the stator.

16. The radial bearing assembly of claim 14, wherein the polycrystalline diamond element limits lateral movement of the rotor.

17. The radial bearing assembly of claim 16, wherein the polycrystalline diamond element limits axial movement of the rotor.

18. The radial bearing assembly of claim 14, wherein the rotor includes a groove defining the opposing engagement surface, and wherein the polycrystalline diamond element is positioned within the groove of the rotor.

19. The radial bearing assembly of claim 14, wherein the rotor includes a conical surface that defines the opposing engagement surface, wherein the engagement surface of the polycrystalline diamond element is in contact with the conical surface, and wherein the polycrystalline diamond element limits lateral and upward axial movement of the rotor and allows rotation of the rotor.

20. The radial bearing assembly of claim 14, wherein the opposing engagement surface is a convex surface on the rotor, wherein the engagement surface of the polycrystalline diamond element is in contact with the convex surface, and wherein the polycrystalline diamond element limits lateral and upward axial movement of the rotor and allows rotation of the rotor.

21. The radial bearing assembly of claim 14, further comprising a plurality of polycrystalline diamond elements arranged in a ring on the stator.

22. The radial bearing assembly of claim 13, wherein the polycrystalline diamond element is positioned and arranged on the rotor in sliding contact with the stator, and wherein the stator includes at least some of the diamond reactive material and includes the opposing engagement surface thereon.

23. The radial bearing assembly of claim 22, wherein the polycrystalline diamond element is positioned within sockets in the rotor.

24. The radial bearing assembly of claim 22, wherein the polycrystalline diamond element limits lateral movement of the rotor and allows rotation of the rotor.

25. The radial bearing assembly of claim 22, wherein the stator includes a conical surface that defines the opposing engagement surface, wherein the engagement surface of the polycrystalline diamond element is in contact with the conical surface, and wherein the polycrystalline diamond element limits lateral and upward axial movement of the rotor and allows rotation of the rotor.

26. The radial bearing assembly of claim 22, wherein the opposing engagement surface is a concave surface on the stator, wherein the engagement surface of the polycrystalline diamond element is convex and is in contact with the concave surface of the stator, and wherein the convex polycrystalline diamond element limits lateral and upward axial movement of the rotor and allow rotation of the rotor.

27. The radial bearing assembly of claim 13, wherein the rotor has a variable rotational velocity, and wherein the engagement surface follows an engagement path on the opposing engagement surface that is constant through the variable rotational velocities.

28. The radial bearing assembly of claim 1, further comprising a solid lubricant on the opposing engagement surface.

29. The radial bearing assembly of claim 1, wherein the sliding engagement between the engagement surface and the opposing engagement surface is non-lubricated.

30. The radial bearing assembly of claim 1, wherein the engagement surface is in sliding engagement with the opposing engagement surface along a contact area, wherein said opposing engagement surface rotates about an axis of rotation, and wherein any imaginary line extending from and normal to said contact surface is at an angle relative to said axis of rotation.

31. The radial bearing assembly of claim 1, wherein the engagement surface is in sliding contact with the opposing engagement surface through a substantial portion of its use profile.

32. The radial bearing assembly of claim 1, wherein the rotor has a rotational velocity, wherein the engagement between said engagement surface and said opposing engagement surface defines a contact area, and wherein said contact area is independent of the rotational velocity of said rotor.

33. The radial bearing assembly of claim 1, wherein the diamond reactive material is softer than a superhard material, as determined in accordance with ASTM E10-14.

34. The radial bearing assembly of claim 1, wherein the opposing engagement surface is a metal surface, wherein the diamond reactive material is a metal or metal alloy that contains from 45 to 100 weight percent of iron, cobalt, nickel, ruthenium, rhodium, palladium, chromium, manganese, copper, titanium, tantalum, or an alloy thereof.

35. The radial bearing assembly of claim 1, wherein the diamond reactive material comprises from 50 to 100 weight percent of diamond catalyst or diamond solvent.

36. The radial bearing assembly of claim 1, wherein the opposing engagement surface is a metal surface, wherein the diamond reactive material includes a diamond catalyst or diamond solvent, wherein the diamond catalyst or diamond solvent includes an iron-based, cobalt-based, or nickel-based superalloy.

37. The radial bearing assembly of claim 1, wherein the opposing engagement surface is a metal surface.

38. A method comprising:
providing a radial bearing assembly, the radial bearing assembly including polycrystalline diamond elements, wherein each polycrystalline diamond element includes an engagement surface;
interfacing engagement between a rotor and a stator with the polycrystalline diamond elements, such that the engagement surfaces are in sliding engagement with an opposing engagement surface, wherein the opposing engagement surface includes at least some diamond reactive material; and
providing a solid lubricant on the opposing engagement surface.

39. The method of claim 38, wherein providing the radial bearing assembly includes highly lapping, polishing, or highly polishing the engagement surfaces.

40. The method of claim 39, wherein the engagement surfaces are polished to have surface finishes that are equal to or less than 20 μin.

41. The method of claim 38, wherein interfacing engagement between the rotor and the stator includes avoiding edge and point contact between the polycrystalline diamond elements and the opposing engagement surface.

42. The method of claim 38, further comprising saturating the opposing engagement surface with carbon prior to the interfacing.

43. The method of claim 38, wherein the opposing engagement surface is a metal surface, wherein the diamond reactive material includes diamond catalyst or diamond solvent, the diamond catalyst or diamond solvent including iron or an alloy thereof, cobalt or an alloy thereof, nickel or an alloy thereof, ruthenium or an alloy thereof, rhodium or an alloy thereof, palladium or an alloy thereof, chromium or an alloy thereof, manganese or an alloy thereof, copper or an alloy thereof; titanium or an alloy thereof; or tantalum or an alloy thereof; or
wherein the opposing engagement surface is a metal surface, wherein the diamond reactive material includes diamond catalyst or diamond solvent, the diamond catalyst or diamond solvent including an iron-based, cobalt-based, or nickel-based superalloy.

44. The method of claim 38, comprising bearing axial and radial load with the radial bearing assembly.

45. The method of claim 38, wherein the polycrystalline diamond elements are provided on the stator, and wherein the opposing engagement surface is on the rotor.

46. The method of claim 38, wherein the polycrystalline diamond elements are provided on the rotor, and wherein the opposing engagement surface is on the stator.

47. A method of designing and making a radial bearing assembly for a rotor and a stator, wherein the radial bearing assembly includes polycrystalline diamond elements, each polycrystalline diamond element including an engagement surface in sliding engagement with an opposing engagement surface of diamond reactive material, the method comprising:
selecting a configuration of the radial bearing assembly within the rotor and the stator;
calculating a maximum contact pressure per polycrystalline diamond element based on a selected number of polycrystalline diamond elements in the selected configuration of the radial bearing assembly within the rotor and the stator, and based on anticipated load;
wherein the calculated maximum contact pressure is below a preset maximum allowable pressure;
deploying at least a minimum number of the polycrystalline diamond elements on the selected configuration of the radial bearing assembly within the rotor and the stator, wherein the number of the polycrystalline diamond elements fit on the selected configuration of the radial bearing assembly within the rotor and the stator, and making the radial bearing assembly for the rotor and the stator, wherein making the radial bearing assembly includes interfacing engagement between the rotor and the stator with the polycrystalline diamond elements, such that the engagement surfaces are in sliding engagement with the opposing engagement surface.

48. The method of claim 47, wherein a safety factor is applied to the calculated maximum contact pressure, wherein the calculated maximum contact pressure, with the safety factor applied thereto, is below the preset maximum allowable pressure.

49. The method of claim 48, wherein the safety factor is applied to the calculated maximum contact pressure by dividing the calculated maximum contact pressure by the safety factor.

* * * * *